(12) United States Patent
Väisänen

(10) Patent No.: US 7,620,376 B2
(45) Date of Patent: Nov. 17, 2009

(54) METHOD AND ARRANGEMENT FOR PERFORMING ANALOG SIGNAL PROCESSING AND MEASURING BETWEEN A SIGNAL SOURCE AND A LOAD

(75) Inventor: Risto Väisänen, Salo (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 11/267,025

(22) Filed: Nov. 3, 2005

(65) Prior Publication Data

US 2007/0099583 A1 May 3, 2007

(51) Int. Cl.
*H03C 1/52* (2006.01)
(52) U.S. Cl. ....................... 455/107; 375/300
(58) Field of Classification Search ............... 455/107, 455/110–111, 114.2, 115.1, 115.4
See application file for complete search history.

(56) References Cited

U.S. PATENT DOCUMENTS 6,317,608 B1 * 11/2001 Glocker .................. 455/553.1

2003/0111997 A1 * 6/2003 McMorrow ................. 324/95
2004/0127178 A1 * 7/2004 Kuffner ....................... 455/133
2006/0105723 A1 * 5/2006 Anvari ..................... 455/114.2

FOREIGN PATENT DOCUMENTS

| WO | 03/043207 | 5/2003 |
| WO | WO 03/043207 A1 * | 5/2003 |

* cited by examiner

Primary Examiner—Duc Nguyen
Assistant Examiner—Angelica M Perez

(57) ABSTRACT

A method and arrangement is shown for performing analog signal processing tasks like impedance matching, phase shifting, and/or signal filtering on a signal path from a signal source to a load so that a number of electrical components is smaller than that of solutions according to prior art for performing corresponding analog signal processing tasks. The signal source can be e.g. a power amplifier of a transmitter and the load can be e.g. an antenna of the transmitter. A solution is shown in which a same ninety degree phase shifter element (910) is used for performing more than one of the analog signal processing tasks of the kind mentioned above.

21 Claims, 13 Drawing Sheets

US 7,620,376 B2

METHOD AND ARRANGEMENT FOR PERFORMING ANALOG SIGNAL PROCESSING AND MEASURING BETWEEN A SIGNAL SOURCE AND A LOAD

FIELD OF THE INVENTION

The invention relates to analog signal processing in communicating devices. The invention especially relates to a method and arrangement for performing analog signal processing tasks like impedance matching, phase shifting, and/or signal filtering on a signal path from a signal source to a load. The signal source can be e.g. a power amplifier of a transmitter and the load can be e.g. an antenna of the transmitter.

BACKGROUND OF THE INVENTION

In an electrical system including a signal source that produces an analog signal and a load circuit that delivers the analog signal out from the system analog signal processing is often needed in a signal path between the signal source and the load circuit. The signal source can be, for example, a power amplifier of a transmitter and the load circuit can be, for example, an antenna or a line transformer of the transmitter. The analog signal processing can comprise impedance transformation in order to match an output impedance of the signal source with an input impedance of the load circuit, filtering in order to modify a power spectrum of an output signal of the signal source, and phase shifting for e.g. signal level measurement purposes. For example, in a mobile communication device one or more of the following operations are needed: impedance matching on a signal path from a power amplifier to an antenna, filtering out harmonics of an output signal of the power amplifier, separating a received signal from a signal to be transmitted in order to provide a duplex communication channel, measuring an output power of the power amplifier, and/or performing antenna switching e.g. changing a position of the antenna from being connected to a transmitter to being connected to a receiver and vice versa.

DESCRIPTION OF THE PRIOR ART

An exemplary receiver-transmitter (TX/RX) according to prior art is shown in FIG. 1a. An exemplary point-to-point type operation environment for the receiver-transmitter shown in FIG. 1a is shown in FIG. 1b. FIG. 1b shows two receiver/transmitters 1 and 2 connected with each other via a duplex communication channel 3. Without loosing generality it can be chosen that the receiver-transmitter shown in FIG. 1a corresponds with the receiver-transmitter 1 in FIG. 1b. The ends of the communication channel 3 at the receiver-transmitter 1 and at the receiver-transmitter 2 in FIG. 1b are called a near end 4 and a far end 5, respectively. In the receiver/transmitter shown in FIG. 1a the above-mentioned analog signal processing and/or measuring operations are performed with separate elements each of them designed for a single analog signal processing or measurement operation. In this example the receiver-transmitter has two receiver-transmitter units 141 and 142. In a case of a mobile communication device the receiver transmitter unit 141 can be e.g. a WCDMA receiver-transmitter and the receiver transmitter unit 142 can be e.g. a GSM receiver-transmitter. The receiver-transmitter unit 141 is handled with more details below.

The receiver-transmitter unit 141 has a receiving element 131 and a transmitting element 132. A generator 101 represents a signal source that provides an analog signal to be transmitted to the far end of the communication channel. The generator 101 can be e.g. a power amplifier of a transmitter of a mobile communication device. A voltage source 112 represents an analog signal e_g produced by the generator 101 and a generator impedance 111 represents an output impedance Z_g of the generator. Therefore, the generator 101 is presented here as a Thevenin's equivalent circuit. A channel front-end circuit 102 represents an electrical system that is connected to the near end of the communication channel. The channel front-end circuit 102 can be e.g. an antenna in a case of a radio channel as the communication channel or a line transformer in a case of a copper wire pair as the communication channel. A voltage source 114 is a signal source that represents an analog signal e_a that is received from the communication channel, e.g. a voltage induced by an electromagnetic radiation falling to an antenna. A load circuit 113 represents an input impedance Z_a of the channel front-end circuit 102 from the viewpoint of an analog signal to be transmitted to the far end of the communication channel. Therefore, the channel front-end circuit 102 is presented here as a Thevenin's equivalent circuit. An element 103 is a sensor element for measuring signal levels and/or for indicating possible impedance mismatch on a signal path from the generator 101 to the channel front-end circuit 102. An element 104 is an impedance transformer used for matching an impedance Z_v seen from a signal input terminal 122 of the impedance transformer 104 towards the generator 101 with an impedance Z_u seen from a signal output terminal 121 of the impedance transformer 104 towards the channel front-end circuit 102. An element 105 is a band-limiting filter for filtering out the harmonics of the analog signal e_g to be transmitted to the far end. An element 106 is a duplexer filter for preventing the analog signal e_g from being driven to the receiving element 131 and for preventing the received signal e_a from being driven to the transmitting element 132. An element 107 is a throw-over switch for changing a connection of the channel front-end circuit 102 from a configuration in which the channel front-end circuit is connected to the receiver-transmitter unit 141 and not connected to the receiver-transmitter unit 142 to a configuration in which the channel front-end circuit is connected to the receiver-transmitter unit 142 and not connected to the receiver-transmitter unit 141 and vice versa. In a case that the channel front-end circuit 102 is an antenna the throw-over switch 107 is called an antenna switch. Also the receiving element 131 can comprise a sensor element, an impedance transformer, and a band-limiting filter for attenuating received noise that is outside a frequency band used for data transmission from the far end of the communication channel.

In the following presentation we assume that both the generator impedance Z_g and the impedance Z_u are substantially resistive. If this assumption is not valid in a sufficient degree serial and/or parallel reactive components can be used to make the impedances Z_g and Z_u to be substantially resistive.

FIG. 2 presents a sensor element 203 for measuring signal levels and for indicating possible impedance mismatch on a signal path from the generator 201 to an element 204 that is loading the sensor element 203. The sensor element 203 can be used as the sensor element 103 in the system shown in FIG. 1a. The sensor element 203 shown in FIG. 2 is based on a principle depicted in U.S. patent application Ser. No. 11/077, 992 that has not been published at the priority date of the patent application constituted by this document. The sensor element comprises a transmission line 213. An electrical length θ of the transmission line is 90 degrees at a center frequency of the signal to be transmitted. A wave-impedance Zc of the transmission line equals an output impedance Z_g of the generator 201, i.e. Zc=Z_g. In the following analysis we assume that all signals are sinusoids having a frequency equal to the center frequency of the signal to be transmitted. Underlined symbols are phasors that represent an amplitude and a phase of a sinusoidal signal. A phasor $\underline{V0}$ of voltage v0 at a load end 220 of the transmission line is $$\underline{V0}=\underline{Va}(1+\rho), \quad (1)$$

where $\underline{Va}$ is a phasor of a voltage caused at the load end by a sinusoidal voltage wave va propagating along the transmission line towards the load end (θ=0) and ρ is a reflection coefficient in respect of the wave-impedance of the transmission line at the load end of the transmission line. The reflection coefficient ρ is $$\rho = \frac{Z\_w - Zc}{Z\_w + Zc}, \quad (2)$$

where Z_w is an input impedance of the element 204.

A phasor $\underline{V90}$ of voltage v90 at a generator end 221 of the transmission line is $$\underline{V90}=\underline{Va}(1-\rho)\times\exp(j\pi/2), \quad (3)$$

where j is an imaginary unit and a factor exp(jπ/2) represents the fact that a phase of a voltage caused at the generator end by the sinusoidal voltage wave va leads by 90 degrees a phase of the corresponding voltage caused at the load end by the sinusoidal voltage wave va. Factor (1−ρ) in equation (3) is based on the fact that the transmission line is assumed to be lossless and the electrical length of the transmission line is 90 degrees. The sensor element comprises phase shifters 214 and 215 that are used for making the phases of the voltages v0 and v90 equal. A phasor $\underline{Vs}$ of voltage vs given by an adder 216 is $$\underline{Vs}=2\times\underline{Va}\times\exp(j\pi/4). \quad (4)$$

An amplitude Vs of the voltage vs is obtained with a detector 212. The amplitude Va is 2×Va, where Va is an amplitude of the sinusoidal voltage wave va propagating towards the load end (l=0) of the transmission line. Phase shifters 217 and 218 are used for making the phases of the voltages v0 and v90 opposite. A phasor $\underline{Vp}$ of voltage vp given by an adder 219 is $$\underline{Vp}=2\times\rho\times\underline{Va}\times\exp(j3\pi/4). \quad (5)$$

An amplitude Vp of the voltage vp is obtained with a detector 211. The amplitude Vp is 2×Va×abs(ρ), where abs(ρ) is a modulus of the reflection coefficient ρ.

When there is a sufficient impedance match, the input impedance Z_w of the element 204 equals substantially an output impedance Z_v of the sensor element, i.e. Z_v≈Z_w. As the wave-impedance Zc of the transmission line 213 equals the generator impedance Z_g, the output impedance Z_v of the sensor element equals the wave-impedance Zc, i.e. Z_v=Zc. Therefore, in an impedance-matched situation the input impedance Z_w of the element 204 equals substantially the wave-impedance Zc, i.e. Zc≈Z_w. As a corollary, in an impedance-matched situation the reflection coefficient ρ in respect of the wave-impedance Zc is substantially zero. Therefore, a possible impedance mismatch can be detected with the aid of the voltage amplitude Vp. The voltage amplitude Vs is proportional to a signal level delivered to the system 204 in an impedance-matched situation.

As evident, based on the above-mentioned principles it is possible to construct a sensor element that forms only an indication of a signal level Vs and also to construct a sensor element that forms only an indication of an impedance mismatch Vp.

FIG. 3 shows a quarter-wave impedance transformer 304 that can be used as the impedance transformer 104 in the system shown in FIG. 1a. The impedance transformer comprises a transmission line 311 having an electrical length of 90 degrees at the center frequency of the signal to be transmitted. A wave-impedance Zc of the transmission line is a geometric mean of an output impedance Z_v of a system 303 feeding the impedance transformer and an input impedance Z_u of a system 305 loading the impedance transformer, i.e.

$$Zc=\sqrt{Z\_u \times Z\_v}. \quad (6)$$

An input impedance Z_in of the impedance transformer 304 is Z_v and an output impedance Z_out of the impedance transformer is Z_u. Therefore, there is an impedance-matched situation at a signal input terminal 321 and at a signal output terminal 322 of the impedance transformer.

FIG. 4 shows an example of a filtering circuit that can be used as the band-limiting filter 105 in the system shown in FIG. 1a. This filtering circuit is able to filter out a resonance frequency of a parallel LC-circuit 401 and resonance frequencies serial LC-circuits 402 and 403.

FIG. 5 shows an example of a duplexer filter. If the duplexer filter shown in FIG. 5 is used as the duplexer filter 106 in the system shown in FIG. 1a, TX-terminal 523, RX-terminal 524, and TX/RX terminal 525 in FIG. 5 correspond with terminals 123, 124, and 125 in FIG. 1a, respectively.

The duplexer filter comprises filter elements 501 and 502 and transmission lines 503 and 504. The filter element 501 prevents a received signal that is coupled to the TX/RX-terminal 525 from flowing to the TX-terminal 523 in a way that an impedance Z_tx0 is nearly zero at a frequency band of the received signal. The filter element 502 prevents a transmitted signal that is coupled to the TX-terminal 523 from flowing to the RX-terminal 524 in a way that an impedance Z_rx0 is nearly zero at a frequency band of the transmitted signal. An electrical length of the transmission line 503 is 90 degrees at the center frequency fc_rx of the received signal. Therefore, an impedance Z_tx1 corresponds substantially an open circuit at the center frequency of the received signal. An electrical length of the transmission line 504 is 90 degrees at the center frequency fc_tx of the transmitted signal. Therefore, an impedance Z_rx1 corresponds substantially an open circuit at the center frequency of the transmitted signal. If a ratio of a bandwidth of the transmitted signal to the center frequency of the transmitted signal is sufficiently small interference caused by an RX-branch 512 of the duplexer filter to the transmitted signal flowing from the TX-terminal 523 to the TX/RX-terminal 525 is substantially zero. Correspondingly, if a ratio of a bandwidth of the received signal to the center frequency of the received signal is sufficiently small interference caused by a TX-branch 511 of the duplexer filter to the received signal flowing from the TX/RX-terminal 525 to the RX-terminal 524 is substantially zero.

FIG. 6 shows an example of a throw-over switch. If the throw-over switch shown in FIG. 6 is used as the a throw-over switch 107 in the system shown in FIG. 1a, terminals 623, 624, and 625 in FIG. 6 correspond with terminals 125, 126, and 127 in FIG. 1a, respectively.

The throw-over switch is controlled by connecting a terminal 627 to a potential +Vdc that is higher than a ground potential 626 or to a potential −Vdc that is lower than the ground potential. The terminal 627 is coupled to the terminal 623 via a dc-decoupling inductor 604 and a current limiting resistor 605. The terminal 623 is coupled to the terminal 625 via a transmission line 603 and to the ground potential 626 via a diode 601. The terminal 624 is coupled to the terminal 625 via a diode 602. We assume here that no dc-currents can flow to/from the throw-over switch via any of the terminals 623, 624, and 625. When the terminal 627 is connected to −Vdc potential the diodes 601 and 602 are in a non-conducting state. In this case a signal path 611 between the terminals 623 and 625 is in use and a signal path 612 between the terminals 624 and 625 is blocked. An impedance Z_a corresponds substantially an open circuit and, therefore, the signal path 612 does not disturb signals flowing in the signal path 611. When the terminal 627 is connected to +Vdc potential the diodes 601 and 602 are in a conducting state. In this case the signal path 612 is in use. The signal path 611 is not in use, because the diode 601 short-circuits the terminal 623 to the ground potential 626, i.e. an impedance Z_b0 is nearly zero. The electrical length of the transmission line 603 is 90 degrees at a center frequency of signals flowing via the terminal 624. The signals flowing via the terminal 624 comprise both a signal flowing from the terminal 624 to the terminal 625 and also a signal flowing in an opposite direction from the terminal 625 to the terminal 624. An impedance Z_b1 corresponds substantially an open circuit at the center frequency of the signals flowing via the terminal 624. If a ratio of a bandwidth of the signals flowing via the terminal 624 to the center frequency of the signals flowing via the terminal 624 is sufficiently small interference caused by the signal path 611 to the signals flowing via terminal 624 is substantially zero.

In many applications it is difficult to realize a transmission line having an electrical length of 90 degrees at a center frequency of a signal to be conducted via the transmission line. If we assume that the center frequency is 900 MHz and a propagation speed of the signal in the transmission line is about 67% of the speed of light in a vacuum a 90 degrees transmission line is about 6 cm long (6 cm≈2.4″). For e.g. a mobile communication device it is very difficult to realize 6 cm transmission lines for the elements shown in FIG. 1*a*.

Equivalent circuits for a lossless transmission line in a frequency domain are shown in FIGS. 7*a* and 7*b*. The equivalent circuits consist of purely reactive electrical elements 701-703 and 704-705. For example, a reactance X of the reactive components 701 and 702 is $$X = Zc \frac{1 - \cos\left(\frac{f}{f90}\frac{\pi}{2}\right)}{\sin\left(\frac{f}{f90}\frac{\pi}{2}\right)}, \quad (7)$$

where f is a frequency at which the equivalent circuits shown in FIGS. 7*a* and 7*b* correspond with the transmission line, f90 is a frequency at which an electrical length of the transmission line is 90 degrees, and Zc is a wave-impedance of the transmission line. The reactive components 701-703 or 704-706 can be modelled with inductors and capacitors as shown in FIGS. 7*c* and 7*d*.

When a transmission line having an electrical length of 90 degrees at a center frequency fc is modelled at the center frequency, i.e. f=f90=fc in equation (7), an inductance L of inductors 711, 712, and 715 shown in FIGS. 7*c* and 7*d* is $$L = \frac{Zc}{2\pi fc}, \quad (8)$$

and a capacitance C of capacitors 713, 714, and 716 shown in FIGS. 7*c* and 7*d* is $$C = \frac{1}{Zc \times 2\pi fc}. \quad (9)$$

Accuracy of modelling the transmission line with the electrical circuits shown in FIGS. 7*c* and 7*d* depends on a ratio of a signal bandwidth to the center frequency, i.e. on an amount by which a ratio f/fc can deviate from unity.

A problem of transmitters, receivers, and receiver-transmitters according to prior art, like the receiver-transmitter shown in FIG. 1*a*, is the fact that a number of electrical components needed for realizing a sensor element, an impedance transformer, a filter, a duplexer filter, and a throw-over switch is quite high. The number of electrical components is high even if all of the above-mentioned elements were not needed in a certain type of a receiver, a transmitter, or a receiver-transmitter. High number of electrical components means high component costs of products, expensive production and quality control routines, need for physical space making miniaturizing of products difficult, and power losses. For example, in the receiver-transmitter shown in FIG. 1*a* a signal attenuation caused by each of the elements 103-107 can be as low as 0.5 dB. Usually an attenuation of 0.5 dB is not considered to be significant and, therefore, quality of the elements 103-107 can be seen to be good when the elements are studied separately. The total attenuation from an input of the element 103 to an output of an element 107 is, however, 2.5 dB that is a significant level of attenuation. In other words, individual elements of a system can be good but the system as a whole can be poor.

BRIEF DESCRIPTION OF THE INVENTION

It is an objective of the present invention to provide a transmitter and a receiver-transmitter so that the above-mentioned limitations and drawbacks associated with prior art are eliminated or reduced. It is also an object of the present invention to provide a mobile communication device having such a transmitter that the above-mentioned limitations and drawbacks associated with prior art are eliminated or reduced. It is also an object of the present invention to provide a mobile communication device having such a receiver-transmitter that the above-mentioned limitations and drawbacks associated with prior art are eliminated or reduced. It is also an object of the present invention to provide a transmitter module that can be used e.g. in a mobile communication device so that the above-mentioned limitations and drawbacks associated with prior art are eliminated or reduced. It is also an object of the present invention to provide a receiver-transmitter module that can be used e.g. in a mobile communication device so that the above-mentioned limitations and drawbacks associated with prior art are eliminated or reduced. It is also an object of the present invention to provide a method for performing analog signal processing of the kind described above between a signal source and a load so that the limitations and drawbacks associated with prior art are eliminated or reduced.

In the remainder of this document a transmission line having an electrical length of substantially 90 degrees at a certain frequency value and an electrical circuit that emulates the transmission line on a frequency band including said frequency value are called a 90 degrees phase shifter. An electrical circuit consisting of inductors and capacitors that emulates a transmission line is called a 90 degrees LC phase shifter.

The objectives of the invention are achieved with a solution in which a same 90 degrees phase shifter is used for performing more than one of the analog signal processing tasks of the kind described above:
  phase shifting for measurement of a signal level and/or for indication of a possible impedance mismatch,
  impedance transformation,
  band-limiting filtering,
  duplexer filtering, and
  phase shifting for a throw-over switch.

The invention yields appreciable benefits compared to prior art solutions. The number of electrical components needed for performing analog signal processing can be reduced yielding the following advantages:
  component costs of products are reduced,
  production and quality control costs are reduced,
  a need for physical space is reduced, thus making miniaturizing of products easier, and
  power losses are reduced.

According to the first aspect of the invention there is provided a transmitter that comprises a channel front-end circuit and a transmitting element. The transmitting element has a signal source, a signal output terminal, and a 90 degrees phase shifter coupled between the signal source and the signal output terminal. The channel front-end circuit is coupled to the signal output terminal of the transmitting element. The transmitter according to the first aspect of the invention is characterized in that:
  the 90 degrees phase shifter is a part of a sensor element, the sensor element being disposed to form at least one of the following: an indication of a level of a signal delivered from the transmitting element to the channel front-end circuit and an indication of an impedance mismatch on a signal path from the signal source to the channel front-end circuit, and
  the 90 degrees phase shifter is also at least one of the following: an impedance transformer disposed to perform impedance matching on the signal path from the signal source to the channel front-end circuit, a band-limiting filter disposed to attenuate frequency components of the an output signal of the signal source that are outside a predetermined frequency band, and a part of a throw-over switch disposed to increase an impedance of the signal output terminal of the transmitting element.

According to the second aspect of the invention there is provided a receiver-transmitter that comprises a channel front-end circuit, a receiving element and a transmitting element. The transmitting element has a signal source, a signal output terminal, and a 90 degrees phase shifter coupled between the signal source and the signal output terminal. The channel front-end circuit is coupled to the signal output terminal of the transmitting element. The receiver-transmitter according to the second aspect of the invention is characterized in that:
  the 90 degrees phase shifter is a part of a throw-over switch disposed to increase an impedance of the signal output terminal of the transmitting element, and
  the 90 degrees phase shifter is also a part of a duplexer filter disposed to prevent a received signal received at the channel front-end circuit from flowing to the transmitting element.

According to the third aspect of the invention there is provided a mobile communication device that comprises an antenna and a transmitting element. The transmitting element has a signal source, a signal output terminal coupled to the antenna, and a 90 degrees phase shifter coupled between the signal source and the signal output terminal. The mobile communication device according to the third aspect of the invention is characterized in that:
  the 90 degrees phase shifter is a part of a sensor element, the sensor element being disposed to form at least one of the following: an indication of a level of a signal delivered from the transmitting element to the antenna and an indication of an impedance mismatch on a signal path from the signal source to the antenna, and
  the 90 degrees phase shifter is also at least one of the following: an impedance transformer disposed to perform impedance matching on the signal path from the signal source to the antenna, a band-limiting filter disposed to attenuate frequency components of an output signal of the signal source that are outside a predetermined frequency band, and a part of an antenna switch disposed to increase an impedance of the signal output terminal of the transmitting element.

According to the forth aspect of the invention there is provided a mobile communication device that comprises a receiver-transmitter having an antenna, a receiving element, and a transmitting element. The transmitting element has a signal source, a signal output terminal coupled to the antenna, and a 90 degrees phase shifter coupled between the signal source and the signal output terminal. The mobile communication device according to the forth aspect of the invention is characterized in that:
  the 90 degrees phase shifter is a part of an antenna switch disposed to increase an impedance of the signal output terminal of the transmitting element, and
  the 90 degrees phase shifter is also a part of a duplexer filter disposed to prevent a received signal received at the antenna from flowing to the transmitting element.

According to the fifth aspect of the invention there is provided a transmitter module that comprises a signal input terminal, a signal output terminal, and a 90 degrees phase shifter coupled between the signal input terminal and the signal output terminal. The transmitter module according to the fifth aspect of the invention is characterized in that:
  the 90 degrees phase shifter is a part of a sensor element, the sensor element being disposed to form at least one of the following: an indication of a level of a signal delivered to the signal output terminal and an indication of an impedance mismatch on a signal path from the signal input terminal to the signal output terminal, and
  the 90 degrees phase shifter is also at least one of the following: an impedance transformer disposed to perform impedance matching on the signal path from the signal input terminal to the signal output terminal, a band-limiting filter disposed to attenuate frequency components of a signal received at the signal input terminal that are outside a predetermined frequency band, and a part of a throw-over switch disposed to increase an impedance of the signal output terminal.

According to the sixth aspect of the invention there is provided a receiver-transmitter module that comprises a reception terminal, a transmission terminal, a channel terminal, and a 90 degrees phase shifter coupled between the transmission terminal and the channel terminal. The receiver-transmitter module according to the sixth aspect of the invention is characterized in that:
  the 90 degrees phase shifter is a part of a throw-over switch disposed increase an impedance of the channel terminal, and the 90 degrees phase shifter is also a part of a duplexer filter disposed to prevent a received signal received at the channel terminal from flowing along a signal path from the channel terminal to the transmission terminal.

According to the seventh aspect of the invention there is provided a method for performing analog signal processing between a signal source and a load. The method according to the seventh aspect of the invention is characterized in that the method comprises:

using a 90 degrees phase shifter coupled between the signal source and the load for obtaining two versions of an output signal of the signal source, the two versions having a mutual phase shift and being used for at least one of the following: forming an indication of a level of a signal delivered to the load and forming an indication an impedance mismatch on a signal path from the signal source to the load, and using said 90 degrees phase shifter also for at least one of the following: performing impedance matching on the signal path from the signal source to the load, attenuating frequency components of the output signal of the signal source that are outside a predetermined frequency band, and increasing an impedance seen from the load towards the signal source when a signal output terminal of the signal source is short-circuited.

According to the eighth aspect of the invention there is provided a method for performing analog signal processing in a receiver-transmitter that comprises a transmitting element, a receiving element, and a channel front-end circuit. The transmitting element has a signal source, a signal output terminal coupled to the channel front-end circuit, and a 90 degrees phase shifter coupled between the signal source and the signal output terminal. The method according to the eighth aspect of the invention is characterized in that the method comprises:

using the 90 degrees phase shifter for preventing a received signal received at the channel front-end circuit from flowing to the transmitting element at least in a situation in which the transmitting element performs transmission, and using the 90 degrees phase shifter for increasing an impedance of the signal output terminal of the transmitting element when a signal output terminal of the signal source is short-circuited.

Features of various advantageous embodiments of the invention are described below.

The exemplary embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The invention and its other advantages are explained in greater detail below with reference to the preferred embodiments presented in the sense of examples and with reference to the accompanying drawings, in which.

DETAILED DESCRIPTION OF THE PREFERRED EMBODIMENTS OF THE INVENTION

FIGS. 1-7 have been explained above in the description of the prior art.

Figure 8A:
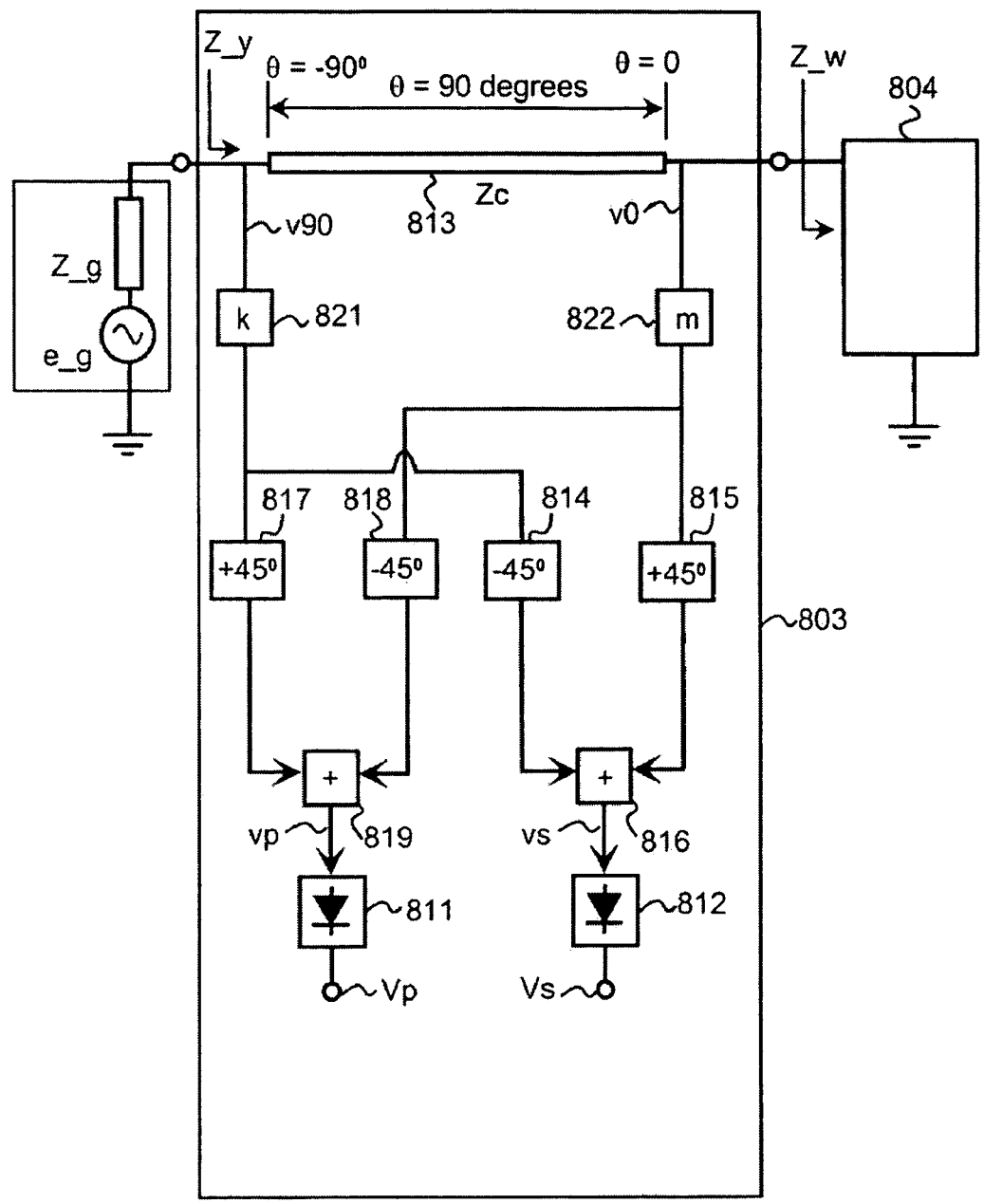
FIGS. 8a and 8b show combined sensor elements and quarter-wave impedance transformers according to an embodiment of the invention.

FIG. 8a shows a combined sensor element and impedance transformer 803 according to an embodiment of the invention in which one 90 degrees phase shifter is used as a part of a sensor element and also as a quarter-wave impedance transformer. In this embodiment of the invention the 90 degrees phase shifter is realized with a transmission line 813 having an electrical length of 90 degrees at a center frequency of a signal e_g. A wave impedance $Z_c$ of the transmission line is chosen so that there is an impedance matched situation, i.e. an impedance $Z\_y$ is sufficiently near to a generator impedance $Z\_g$. This is accomplished by choosing:

$$Z_c = \sqrt{Z\_g \times Z\_w}, \tag{10}$$

where $Z\_w$ is an input impedance of a system 804 loading the combined sensor element and impedance transformer 803. A reflection coefficient $\rho$ in respect of the wave impedance is $$\rho = \frac{Z\_w - Zc}{Z\_w + Zc}. \quad (11)$$

In the impedance matched situation the reflection coefficient ρ in respect of the wave impedance is not zero when Zc≠Z_w. Therefore, a voltage level at a generator end (θ=−90°) of the transmission line 813 is not same as a voltage level at a load end (θ=0), i.e. VSWR>1. In this kind of situation indications that express a signal level and an impedance mismatch cannot be obtained with a similar treatment as in a case in which Zc=Zw in the impedance matched situation.

The fact that the voltage levels at the ends of the transmission line are different in the impedance matched situation can be compensated with scaling elements 821 and 822 that multiply voltages v90 and v0 with scaling factors k and m, respectively. The scaling factors k and m can be chosen to be $$k = \sqrt{\frac{Zc}{Z\_g}} \text{ and } m = \sqrt{\frac{Zc}{Z\_w}}. \quad (12)$$

Figure 1A:
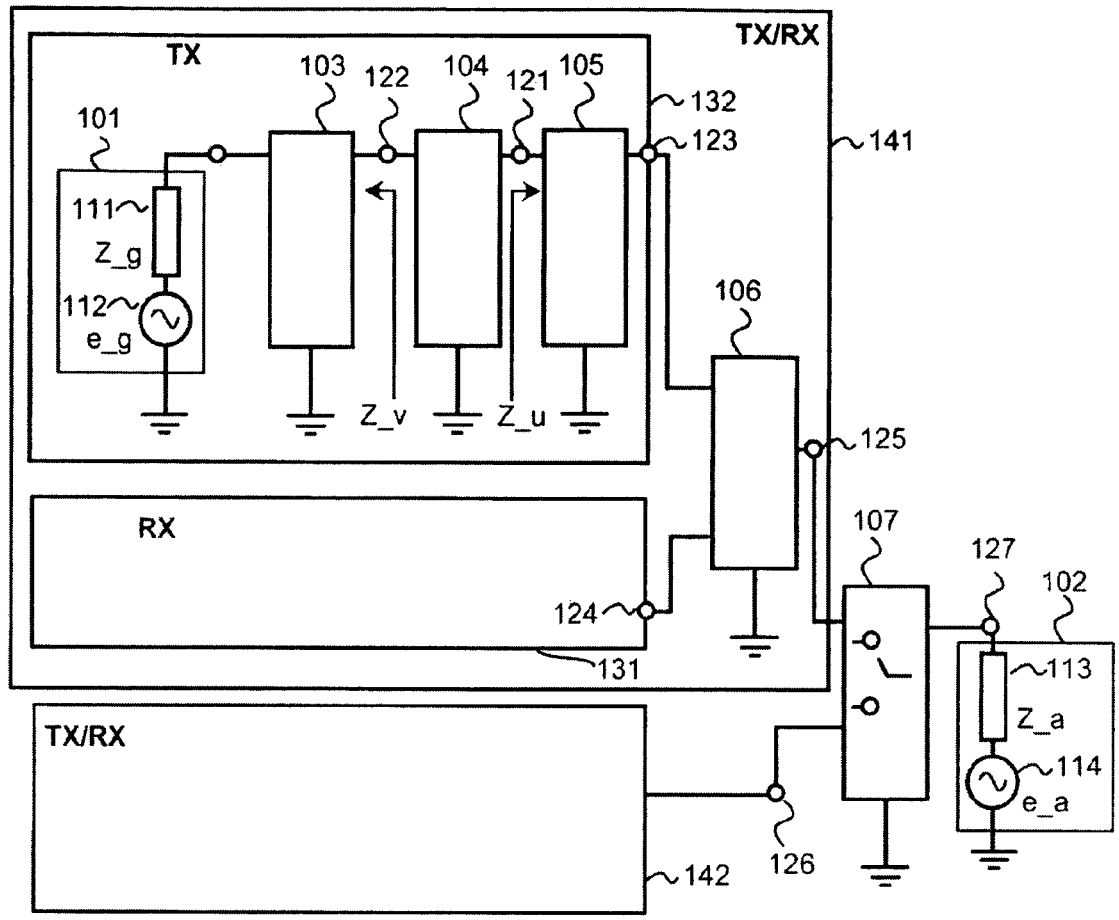
FIG. 1a shows a receiver-transmitter according to prior art.
Figure 1B:
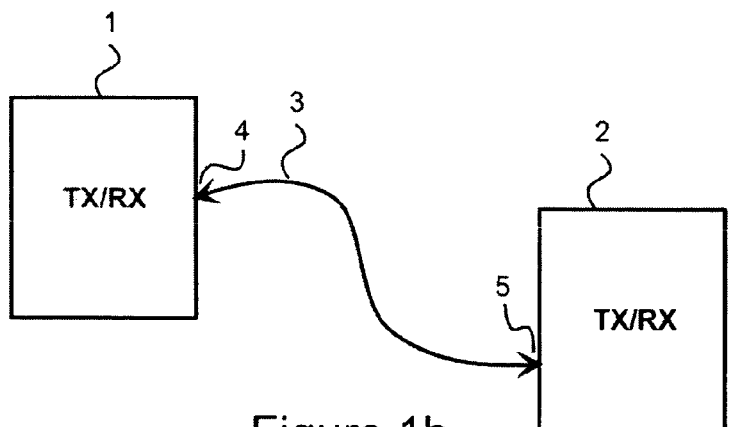
FIG. 1b shows an exemplary point-to-point operating environment for two receiver/transmitters.
Figure 2:
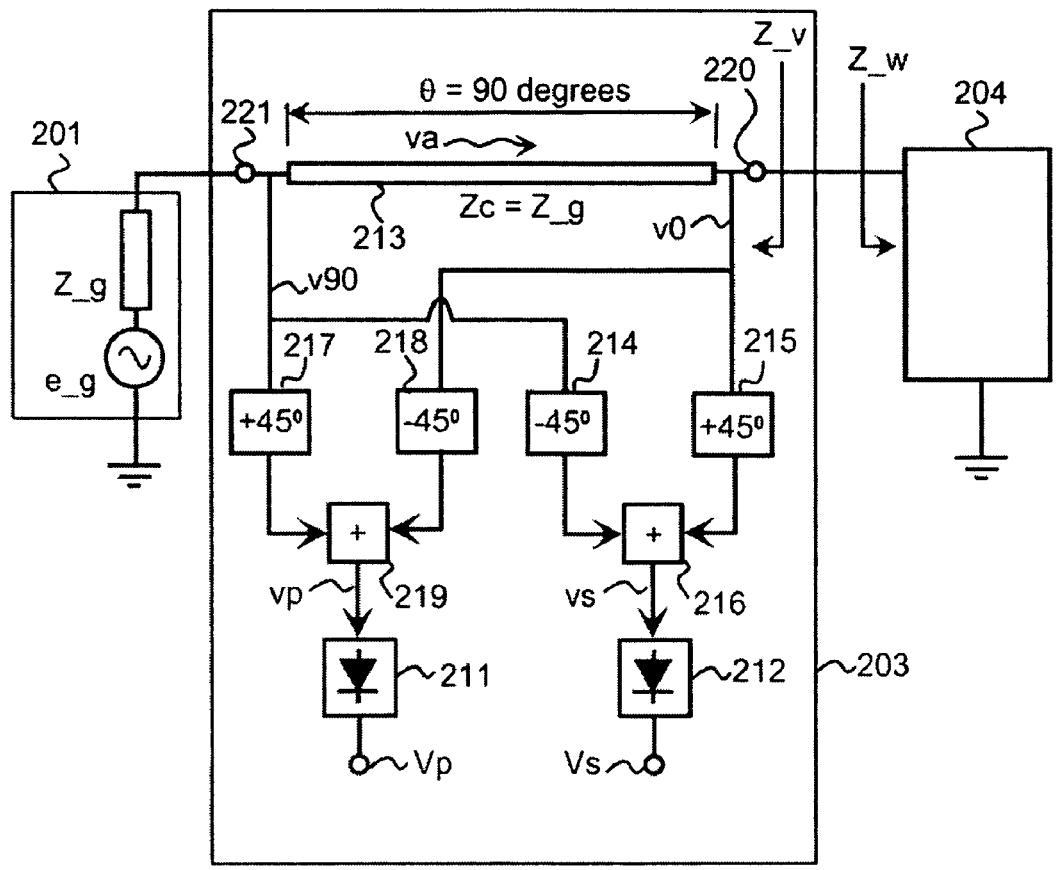
FIG. 2 shows a sensor element for measuring levels of signals and for indicating impedance mismatch according to prior art.
Figure 3:
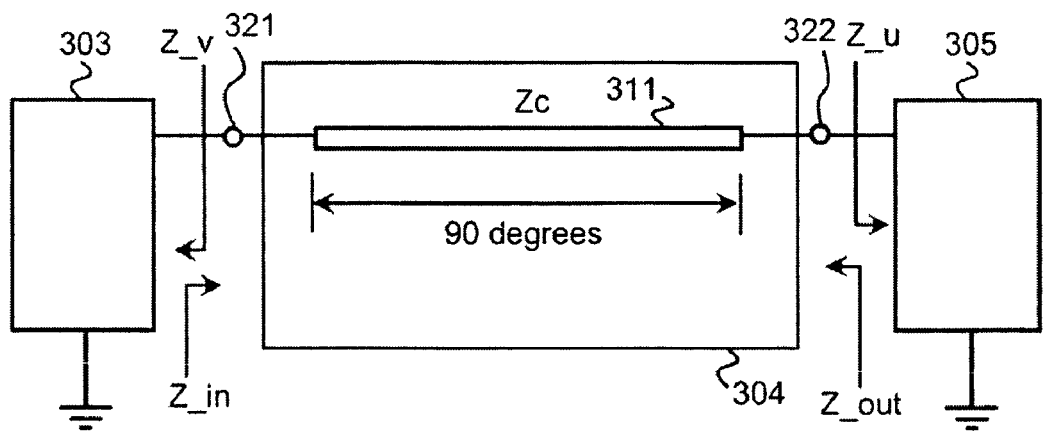
FIG. 3 shows a quarter-wave impedance transformer according to prior art.
Figure 4:
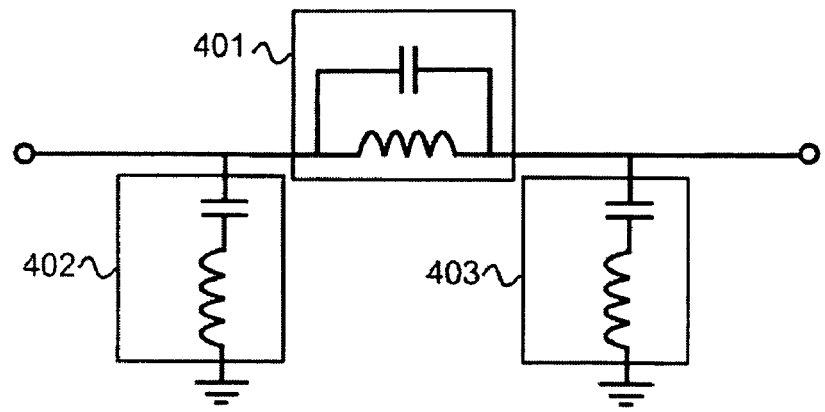
FIG. 4 shows a filtering circuit according to prior art.
Figure 5:
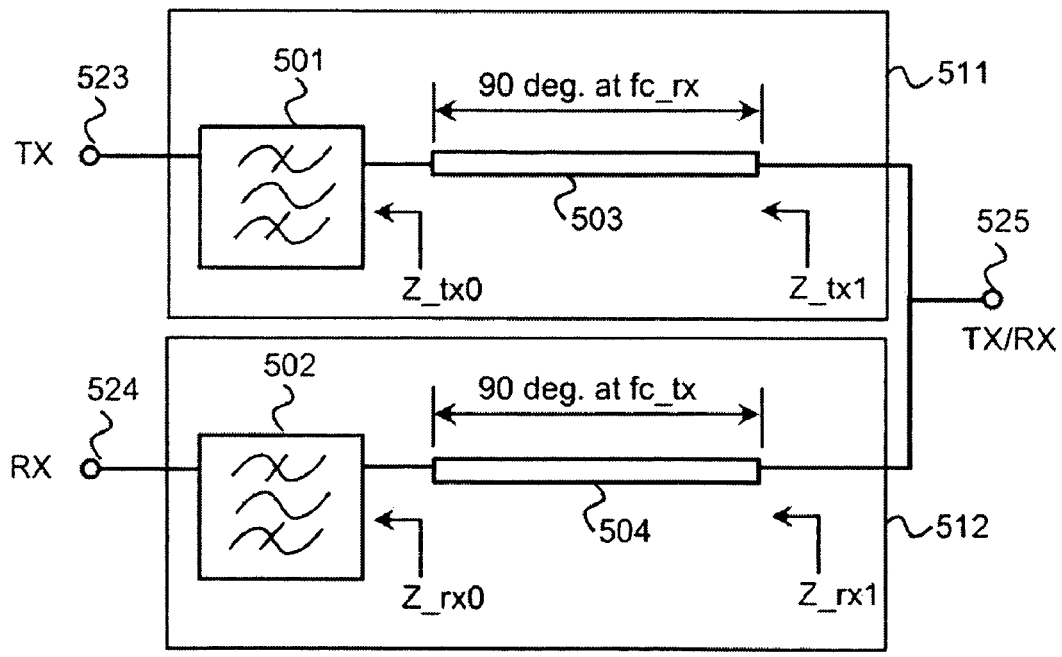
FIG. 5 shows a duplexer filter according to prior art.
Figure 6:
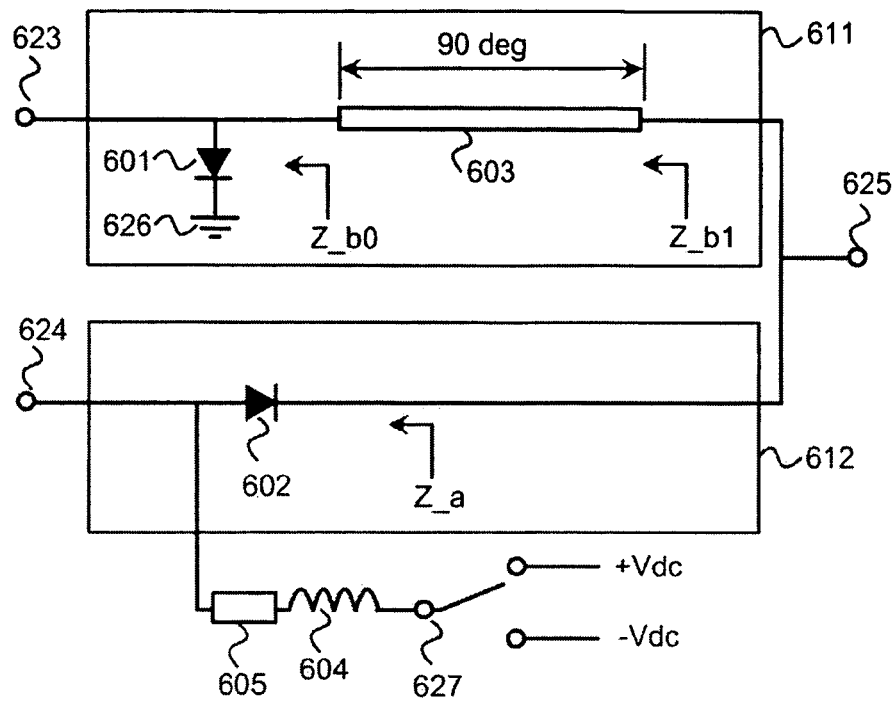
FIG. 6 shows throw-over switch according to prior art.

With these scaling factors voltage values Vp and Vs that are indications of an impedance mismatch and signal level, respectively, can be obtained with a similar treatment using 45 degrees phase shifters 814, 815, 817, and 818, adders 816 and 819, and detectors 811 and 812 as was described in conjunction with a sensor element shown in FIG. 2.

Figure 8B:
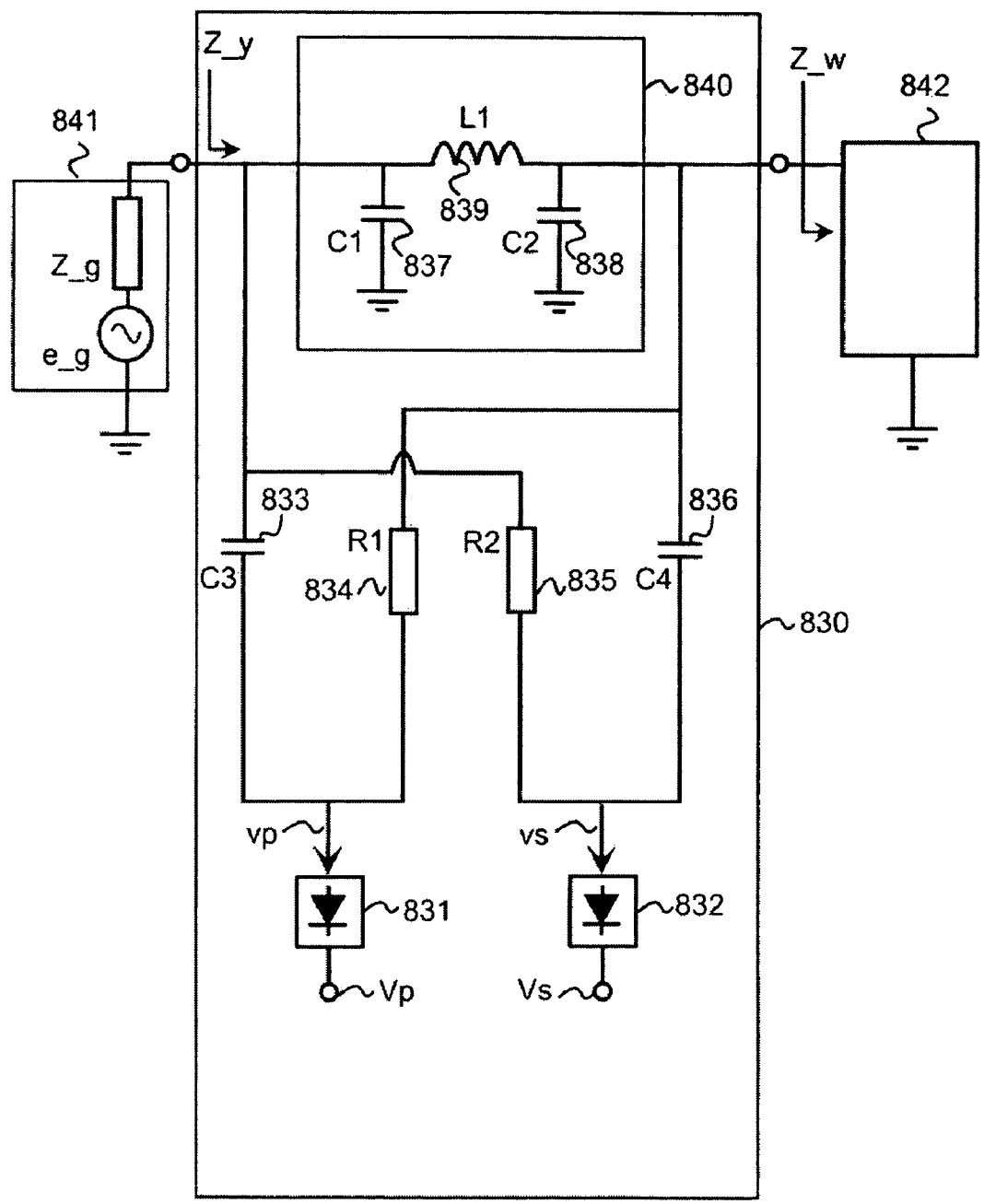

FIG. 8b shows a combined sensor element and impedance transformer 830 according to an embodiment of the invention. In this embodiment of the invention the 45 degrees phase shifters 814, 815, 817, and 818, the adders 816 and 819, and the scaling elements 821 and 822 shown in FIG. 8a are realized with RC-circuits and the 90 degrees phase shifter realized with a transmission line 813 shown in FIG. 8a is replaced with a 90 degrees LC phase shifter. Component values for an inductor 839 and for capacitors 837 and 838 of the 90 degrees LC phase shifter 840 can be chosen to be $$L1 = \frac{Zc}{2\pi fc}, \quad (13)$$

and $$C1 = C2 = \frac{1}{Zc \times 2\pi fc}, \quad (14)$$

where fc is a center frequency of a signal e_g. Component values for e.g. a resistor 835 and for e.g. a capacitor 836 can be chosen to be $$R2 = \frac{Z0}{k} \text{ and } C4 = \frac{m}{2\pi fc \times Z0}, \quad (15)$$

where Z0 is an impedance level that corresponds impedances of the resistor 835 and the capacitor 836 when k=m. The impedance level Z0 has to be so high that the RC circuits composed of the resistors 834 and 835 and the capacitors 833 and 836 do not disturb the operation of the 90 degrees LC phase shifter 840. A suitable impedance level is e.g. Z0=10× Zc.

The above-described embodiment of the invention forms both an indication of a signal level Vs and an indication of an impedance mismatch Vp. Using the above-described principles it is straightforward to construct a corresponding system that forms only the indication of a signal level Vs or only the indication of an impedance mismatch Vp.

Figure 9:
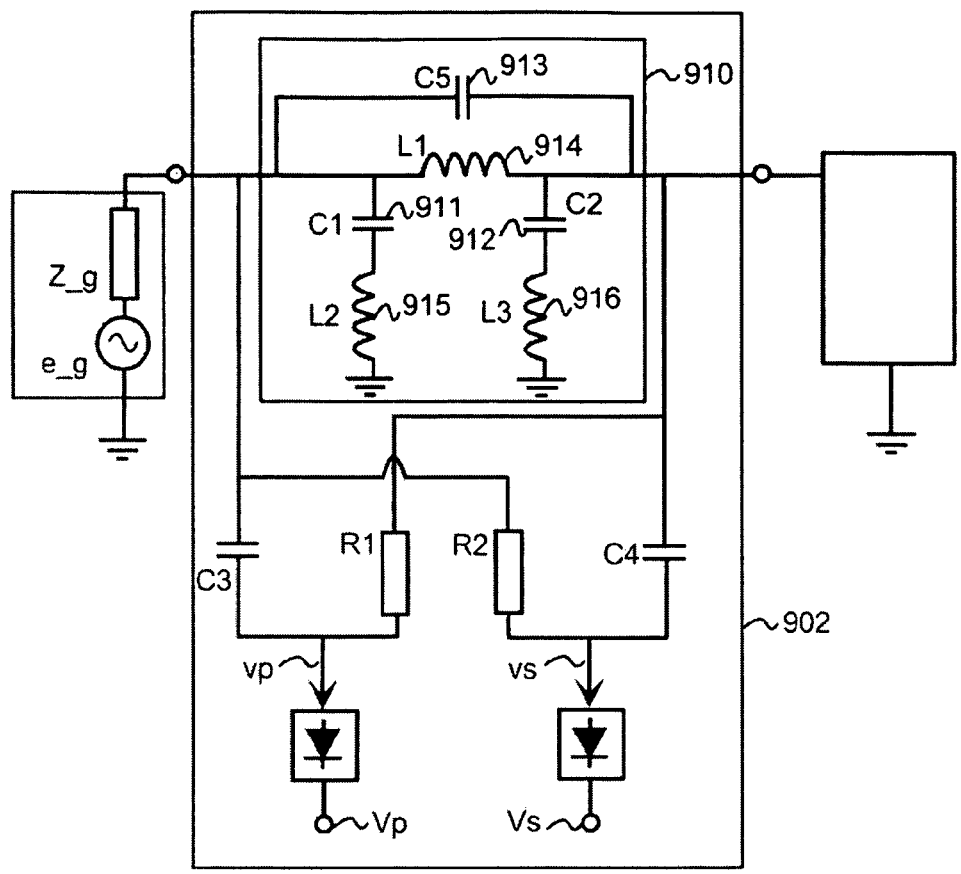
FIG. 9 shows a system in which a 90 degrees LC phase shifter is used as an impedance transformer, as a part of a sensor element, and as a band-limiting filter according to an embodiment of the invention.

FIG. 9 shows a system 902 in which one 90 degrees LC phase shifter 910 is used as an impedance transformer, as a part of a sensor element, and as a band-limiting filter according to an embodiment of the invention. The 90 degrees phase shifter 910 has to emulate a transmission line having an electrical length of 90 degrees at a certain frequency band B around a center frequency fc of a signal e_g. Outside the frequency band B the 90 degrees phase shifter can be used as a band-limiting filter that attenuates certain frequencies e.g. harmonics of the center frequency N×fc, where N is an integer >1.

Figure 7A:
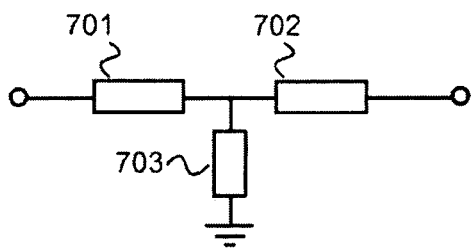
FIGS. 7a and 7b show equivalent circuits of a transmission line in a frequency domain according to prior art and FIGS. 7c and 7d show equivalent circuits of a transmission line realized with inductors and capacitors according to prior art.
Figure 7B:
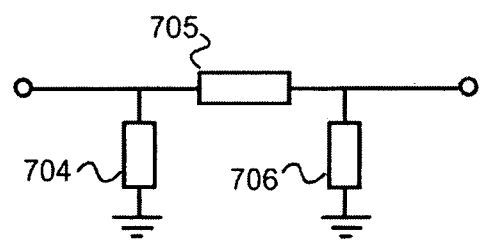
Figure 7C:
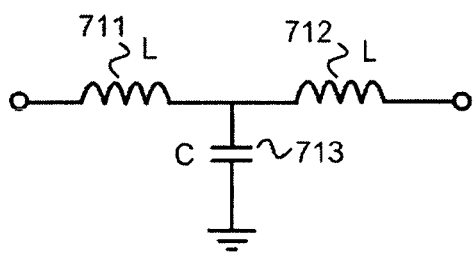
Figure 7D:
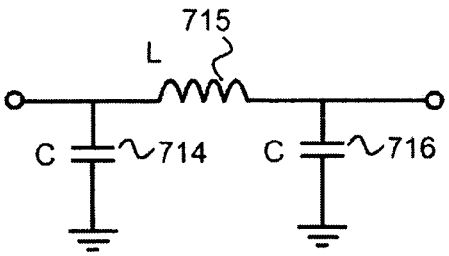

A Π-type equivalent circuit of a lossless transmission line in a frequency domain was shown in FIG. 7b. If an electrical length of a lossless transmission line is 90 degrees and a wave impedance is Zc reactance values for electrical elements 704, 705, and 706 are −Zc, Zc, and −Zc, respectively. The 90 degrees LC phase shifter 910 emulates a 90 degrees lossless transmission line on the frequency band B if at the center frequency fc a reactance of a parallel connection of an inductor 914 and a capacitor 913 is Zc, a reactance of a serial connection of an inductor 915 and a capacitor 911 is −Zc, and a reactance of a serial connection of an inductor 916 and a capacitor 912 is −Zc. Accuracy how well the 90 degrees LC phase shifter 910 emulates a 90 degrees lossless transmission line depends, among others, on a ratio of a bandwidth BW of the frequency band B to the center frequency fc (BW/fc).

The 90-degrees phase shifter 910 operates as a band-limiting filter disposed to attenuate frequency components of the signal e_g that are outside a predetermined frequency band so that the parallel connection of the inductor 914 and the capacitor 913 suppresses a portion of the signal e_g that locates on a narrow frequency band around a frequency fn1, the serial connection of the inductor 915 and the capacitor 911 suppresses a portion of the signal e_g that locates on a narrow frequency band around a frequency fn2, and the serial connection of the inductor 916 and the capacitor 912 suppresses a portion of the signal e_g that locates on a narrow frequency band around a frequency fn3. In this document the predetermined frequency band means a frequency interval or a set of frequency intervals in a frequency domain that has/have been allocated for a signal under consideration.

For example, for an inductance L1 of the inductor 914 and for a capacitance C5 of the capacitor 913 we get the following conditions:

$$2\pi fc \times C5 - \frac{1}{2\pi fc \times L1} = -\frac{1}{Zc} \quad (16)$$

and $$2\pi fn1 \times C5 - \frac{1}{2\pi fn1 \times L1} = 0.$$

From equations (16) we get:

$$L1 = \left(1 - \left(\frac{fc}{fn1}\right)^2\right) \times \frac{Zc}{2\pi fc} \quad (17)$$

and

-continued $$C5 = \frac{1}{(2\pi fn1)^2 \times L1}.$$

Inductance values L2 and L3 of the inductors 915 and 916 and capacitance values C1 and C2 of the capacitors 911 and 912 can be obtained in a corresponding way.

Figure 10A:
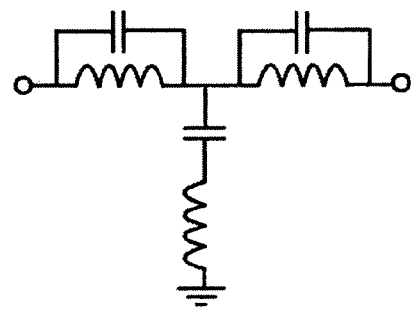
FIG. 10a shows a T-type 90 degrees LC phase shifter that can be used in an embodiment of the invention.

In FIG. 9 the 90 degrees phase shifter 910 is a Π-type circuit composed of inductors and capacitors. A T-type circuit composed of inductors and capacitors that can also be used as a 90 degrees phase shifter in a system shown in FIG. 9 is shown in FIG. 10a. As known by a person skilled to art there are numerous different circuit topologies that can be used for a 90 degrees LC phase shifter. For example, a 90 degrees phase shifter can be realized with a chain of successive Π- and/or T-type circuits. Standard circuit synthesis methods can be used when designing a 90 degrees LC phase shifter.

Figure 10B:
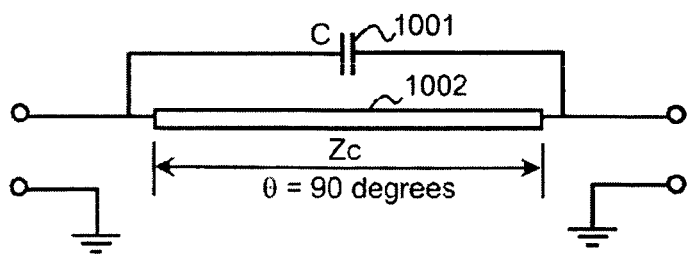
FIG. 10b shows an electrical circuit that can be used as a 90 degrees phase shifter in certain special cases in an embodiment of the invention.

In certain special cases a band-limiting filter can be a 90 degrees phase shifter realized with a transmission line. FIG. 10b shows an electrical circuit in which there is a capacitor 1001 connected between ends of a transmission line 1002. In the Π-type equivalent circuit of a lossless transmission line that was shown in FIG. 7b a reactance value for the circuit element 705 at a frequency fn is $$Zc \times \sin\left(\frac{fn}{fc} \times \frac{\pi}{2}\right),$$

where Zc is a wave impedance of a transmission line 1002. In order to have a parallel resonance at the frequency fn a capacitance C is chosen to be $$C = \frac{1}{2\pi fn \times Zc \times \sin\left(\frac{fn}{fc} \times \frac{\pi}{2}\right)}, \quad (18)$$

The electrical circuit shown in FIG. 10b works in a desirable way only when the equation (18) gives a positive capacitance value C for which $$\frac{1}{2\pi fc \times C} \gg Zc, \quad (19)$$

i.e. when the effect of the capacitor 1001 is negligible at the center frequency fc. The fact that equation (18) may give an unfeasible capacitance value (negative or infinite) with certain values of fn and fc is a limitation of the electrical circuit shown in FIG. 10b that has to be taken into account when designing a system.

The above-presented formulas for obtaining component values were intended to illustrate an operating principle of the embodiments of the invention and basics of design methodologies. When designing a real system one have to take into account that real circuit components include also parasitic elements. E.g. a real inductor includes always a parasitic capacitance and a parasitic resistance and a real capacitor includes always a parasitic inductance and a parasitic resistance.

According to one embodiment of the invention parasitic elements are utilised in a design solution. For example, the capacitor 913 shown in FIG. 9 can be formed completely or partially of a parasitic capacitance of the inductor 914. The inductors 915 and 916 can be formed completely or partially of parasitic inductances of electrical conductors that are used for coupling the capacitors 911 and 912 to the ground and to terminals of the inductor 914. An inductor of a 90 degrees LC phase shifter can be realized with a coil or with a microsrip structure. A capacitor can be realized with a lumped capacitor element or with a microsrip structure. The 45 degrees phase shifters, scaling elements, and adders for which a resistor-capacitor realization has been presented in FIGS. 8b and 9 can also be realized with standard amplifiers, phase shifting circuits, and adder circuits composed of active and/or passive circuit components. A detector shown e.g. in FIG. 8a as a reference 811 or 812 can be a diode detector, a temperature compensated diode detector, or a detector realized with transistors. From the viewpoint of an operation principle a detector can be a non-coherent envelope detector or a coherent detector. It is also possible to down-modulate a signal the amplitude of which is to be detected to a lower frequency band with a local oscillator, to convert the down-modulated signal into a digital form with an analog-to-digital converter, and to perform further operations of the amplitude detection with digital signal processing means.

Figure 11:
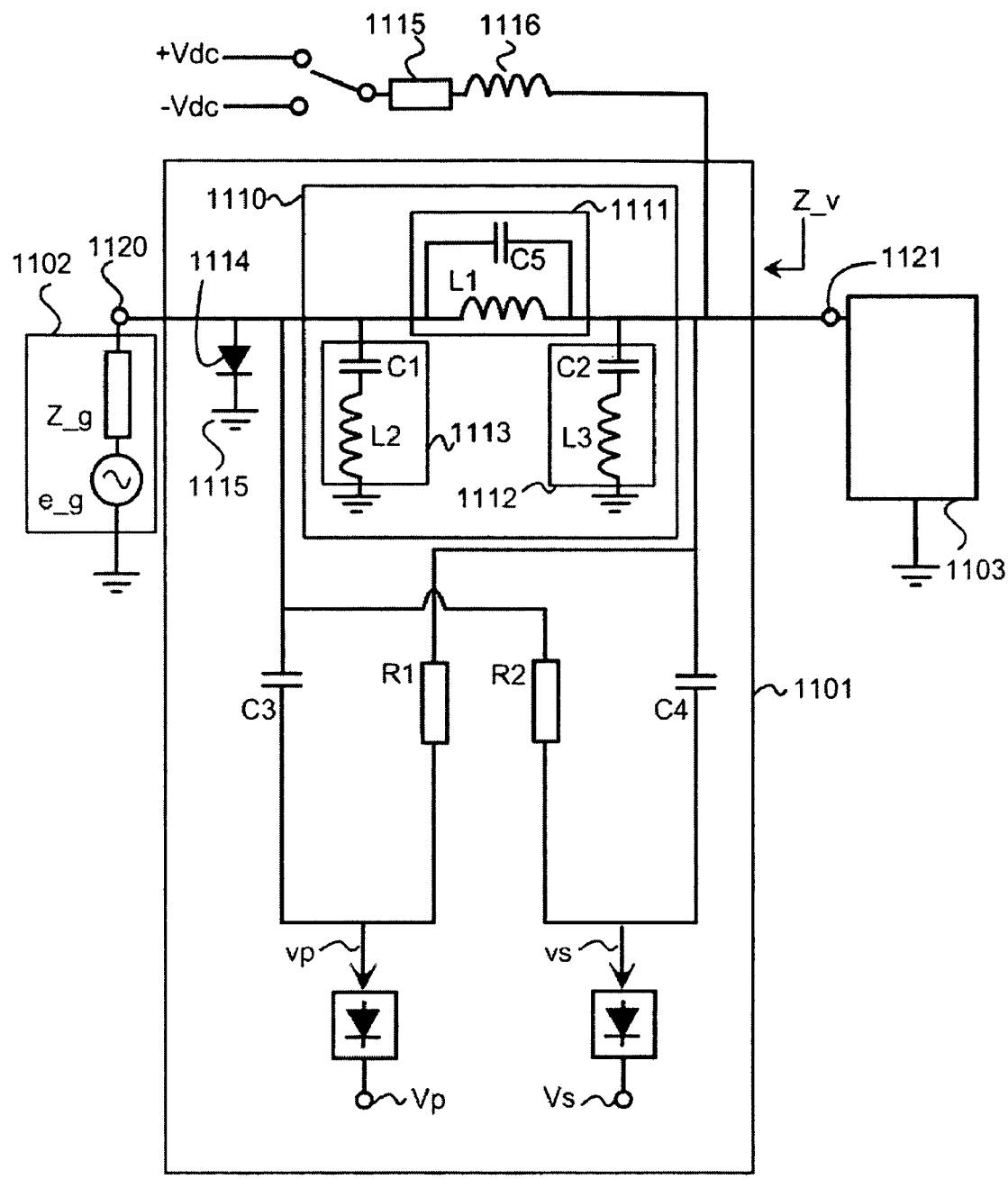
FIG. 11 shows a system in which a 90 degrees LC phase shifter is used as an impedance transformer, as a part of a sensor element, as a band-limiting filter, and as a part of a throw-over switch according to an embodiment of the invention.

FIG. 11 shows a system in which one 90 degrees LC phase shifter 1110 is used as an impedance transformer, as a part of a sensor element, as a band-limiting filter, and as a part of a throw-over switch according to an embodiment of the invention. A terminal 1121 can be coupled via an acdecoupling inductor 1116 and a current limiter resistor 1115 to a positive dc-voltage +Vdc or to a negative dc-voltage −Vdc. When the terminal 1121 is coupled to the negative dc-voltage −Vdc a diode 1114 is in a non-conducting state and a signal e_g is able to flow from a signal source 1102 to a block 1103. When the terminal 1121 is coupled to the positive dc-voltage+Vdc the diode 1114 is in a conducting state and a terminal 1120 is coupled to a ground 1115, i.e. a signal output terminal of the signal source 1102 is short-circuited. The 90 degrees LC phase shifter emulates a transmission line having an electrical length of 90 degrees at a center frequency fc of the signal e_g. Therefore, reactance values of a parallel connection 1111, a serial connection 1112, and a serial connection 1113 are Zc, −Zc, and −Zc, respectively, where Zc is a wave impedance of the emulated transmission line. When the terminal 1120 is coupled to the ground via the diode 1114 the parallel connection 1111 and the serial connection 1112 are connected in parallel between the terminal 1121 and the ground. Since a parallel connection of reactance values −Zc, and Zc corresponds with an open circuit, an impedance Z_v seen from the terminal towards the system 1101 is high. This kind of throw-over switch arrangement can be used in a case in which the block 1103 represents a channel front-end circuit, the system 1101 and the signal source 1102 represent a transmitter and the transmitter needs to be decoupled from the channel front-end circuit in a way that the impedance Z_v is high.

The diode 1114 represents a mean for coupling the terminal 1120 to the ground 1115. Instead of a diode it is also possible to use e.g. a FET-switch, a SOI CMOS switch (Silicon-On-Insulator CMOS), or an RF-MEMS switch (Micro-ElectroMechanical System).

The 90 degrees LC phase shifter 1110 can be replaced with a 90 degrees phase shifter based on a transmission line. The limitations discussed in an earlier part of this document in conjunction with FIG. 10b have to be, however, taken into account when a 90 degrees phase shifter based on a transmission line is used as a band-limiting filter.

Figure 12:
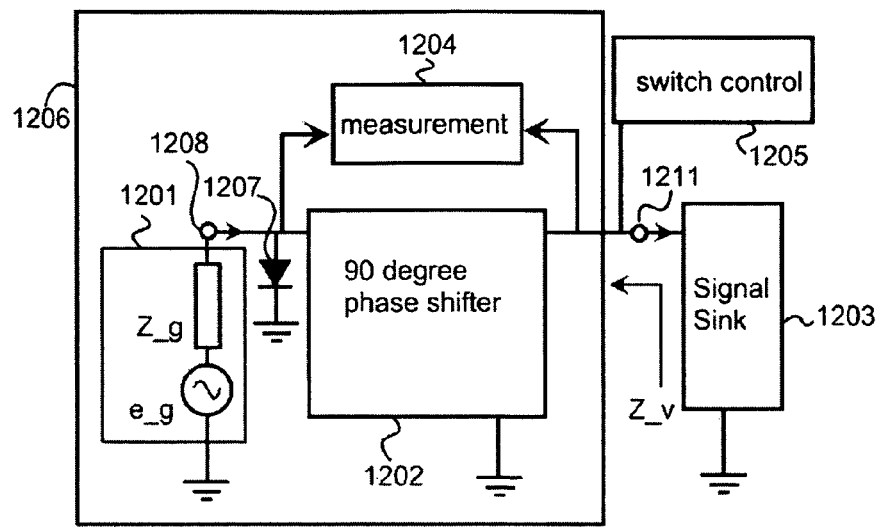
FIG. 12 shows a transmitter according to an embodiment of the invention.

FIG. 12 shows a transmitter according to an embodiment of the invention. The transmitter comprises a transmitting element 1206 having a signal source 1201 and a 90 degrees phase shifter 1202. The transmitter comprises also a channel front-end circuit 1203. The channel front-end circuit act as a signal sink for a signal given by the signal source. The channel front-end circuit can be e.g. an antenna or a line transformer and it can also comprise possible electrical circuitry in front of an antenna or a line transformer. The 90 degrees phase shifter 1202 is a part of a sensor element disposed to form at least one of the following:

an indication of a level of a transmission signal fed into the channel front-end circuit 1203, and an indication of an impedance mismatch on a signal path from the signal source 1201 to the channel front-end circuit 1203.

The sensor element is based on the principles described in earlier parts of this document and e.g. in FIG. 8a or 8b. A block 1204 represents remaining parts of the sensor element, i.e. the parts other than the 90 degrees phase shifter. The 90 degrees phase shifter 1202 is also at least one of the following:

an impedance transformer disposed to perform impedance matching on the signal path from the signal source 1201 to the channel front-end circuit 1203, a band-limiting filter disposed to attenuate frequency components of the transmission signal e_g outside a transmission frequency band on the signal path from the signal source 1201 to the channel front-end circuit 1203, and a part of a throw-over switch disposed to increase an impedance Z_v of a signal output terminal 1211 of the transmitting element when transmission is disabled.

A block 1205 represents control means for the throw-over switch and a diode 1207 represents a mean for coupling an input terminal 1208 of the 90 degrees phase shifter to a ground, i.e. a mean for short-circuiting a signal output terminal of the signal source 1201. With the aid of the throw-over switch a transmitting element 1206 can be decoupled from the channel front-end circuit 1203 in a sense that the impedance Z_v of the transmitting element is high without a need for placing a switch element on the signal path from the signal source 1201 to the channel front-end circuit 1203.

The limitations discussed in an earlier part of this document in conjunction with FIG. 10b have to be taken into account when the 90 degrees phase shifter 1202 is based on a transmission line and it is used as a band-limiting filter.

Figure 13:
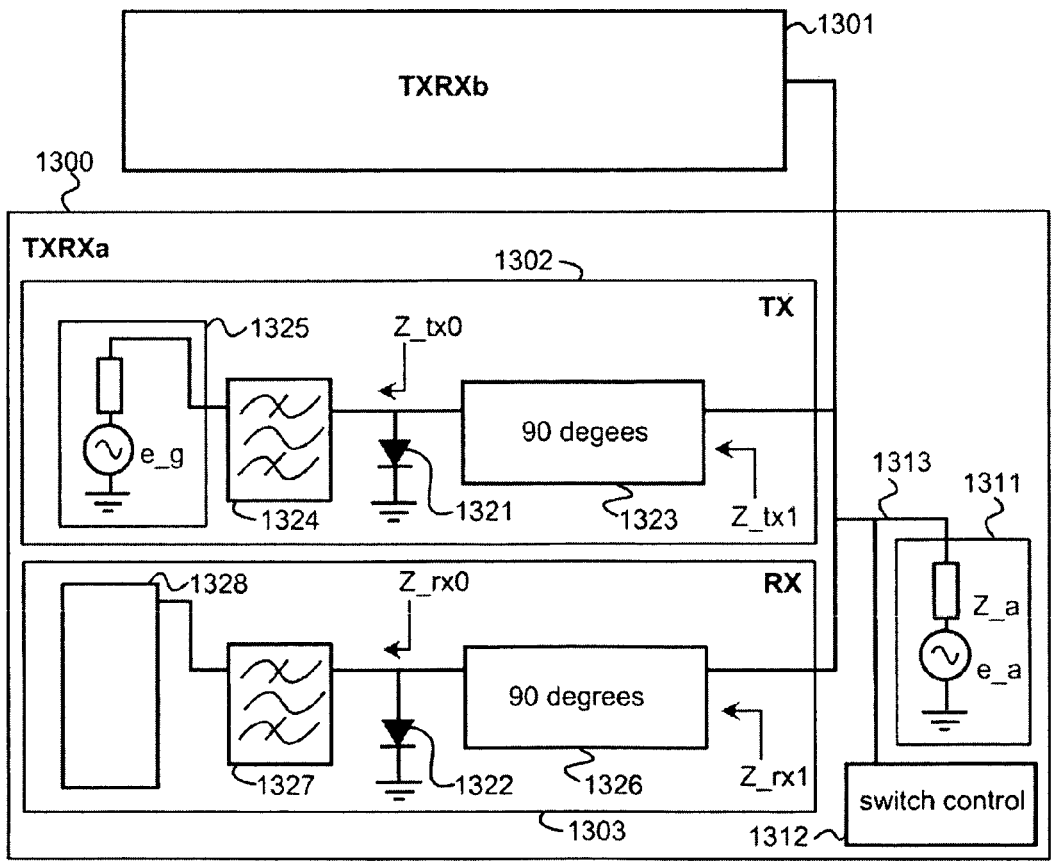
FIG. 13 shows a receiver-transmitter according to an embodiment of the invention.

FIG. 13 shows a receiver-transmitter 1300 according to an embodiment of the invention. The FIG. 13 shows also another receiver-transmitter 1301 that uses a channel front-end circuit 1311 of the receiver-transmitter 1300. The receiver-transmitter 1301 can be otherwise similar to the receiver-transmitter 1300 but diodes of the receiver-transmitter 1301, not shown in the figure, corresponding with diodes 1321 and 1322 have to be oriented to be able to conduct current in an opposite direction than the diodes 1321 and 1322 of the receiver-transmitter 1300. The receiver-transmitter 1300 comprises a transmitting element 1302 and a receiving element 1303. The transmitting element has a 90 degrees phase shifter 1323, a filter element 1324, and signal source 1325.

The filter element 1324 and the 90 degrees phase shifter 1323 form a part of a duplexer filter that prevents a received signal e_a received at the channel front-end circuit 1311 from flowing to the transmitting element 1302. An impedance Z_tx0 is nearly zero at a frequency band of the received signal and, because of the 90 degrees phase shifter 1323, an impedance Z_tx1 is high at the frequency band of the received signal. Therefore, the received signal e_a cannot be driven to the transmitting element 1302.

In this embodiment of the invention the receiving element 1303 has a 90 degrees phase shifter 1326 and a filter element 1327. A block 1328 represents remaining parts of the receiving element, like a demodulator, equalizers, etc. The filter element 1327 and the 90 degrees phase shifter 1326 form a part of a duplexer filter that prevents a transmission signal e_g from flowing to the receiving element 1303. An impedance Z_rx0 is nearly zero at a frequency band of the transmission signal and, because of the 90 degrees phase shifter 1326, an impedance Z_rx1 is high at the frequency band of the transmission signal. Therefore, the transmission signal e_g cannot be driven to the receiving element 1303.

The 90 degrees phase shifters 1323 and 1326 are also parts of a throw-over switch. An operation of the throw-over switch is considered below from the viewpoint of the receiver-transmitter 1300. From the viewpoint of the receiver-transmitter 1300 the throw-over switch is used to determine if the transmission signal e_g is able to flow to the channel front-end circuit 1311 and if the received signal e_a is able to flow to the receiving element 1303. The control element is disposed to determine a polarity of a dc-component of a voltage at a terminal 1313 in respect of a ground.

When the dc-component of the voltage at the terminal 1313 is negative in respect to the ground the diodes 1321 and 1322 are in a non-conducting state and the transmission signal e_g is able to flow to the channel front-end circuit 1311 and the received signal e_a is able to flow to the receiving element 1303. When the dc-component of the voltage at the terminal 1313 is positive in respect to the ground the diodes 1321 and 1322 are in a conducting state and the impedances Ztx0 and Zrx_0 are substantially zero. The transmission signal e_g is not able to flow to the channel front-end circuit 1311. The impedance Z_tx1 of the transmitting element and the impedance Z_rx1 of the receiving element are high for a signal coming from the receiver-transmitter 1302 or from the channel front-end circuit 1311 if the 90 degrees phase shifters 1323 and 1324 can emulate transmission lines having an electrical length of 90 degrees with a sufficient accuracy at a frequency band of said signal. The operation of the throw-over switch from the viewpoint of the receiver-transmitter 1301 is similar to that described above but the polarity of the dc-component of the voltage at the terminal 1313 needs to be reversed.

The 90 degrees phase shifter 1323 can be a 90 degrees LC phase shifter or a transmission line. Correspondingly, the 90 degrees phase shifter 1326 can be a 90 degrees LC phase shifter or a transmission line.

In a receiver-transmitter according to an embodiment of the invention the 90 degrees phase shifter 1323 is also a part of at least one of the following: an impedance transformer, a sensor element of the kind described in earlier parts of this document and e.g. in FIG. 8a or 8b, and a band-limiting filter. The limitations discussed in an earlier part of this document in conjunction with figure 10b have to be taken into account when the 90 degrees phase shifter 1323 is based on a transmission line and it is used as a band-limiting filter.

In a receiver-transmitter according to an embodiment of the invention the 90 degrees phase shifter 1326 is also a part of at least one of the following: an impedance transformer, a sensor element of the kind described in earlier parts of this document and e.g. in FIG. 8a or 8b, and a band-limiting filter. The limitations discussed in an earlier part of this document in conjunction with figure 10b have to be taken into account when the 90 degrees phase shifter 1326 is based on a transmission line and it is used as a band-limiting filter.

In a receiver-transmitter according to an embodiment of the invention the impedance Z_rx0 of the filter element 1327 is high at the frequency band of the transmission signal e_g and, in a signal path from the channel front-end circuit 1311 to the block 1328, there is a switch that can set to a non-conducting state. The switch can be e.g. FET-switch, a SOI CMOS-switch, or a MEMS-switch. In this embodiment of the invention the receiver element 1303 does not need to comprise a 90 degrees phase shifter.

Figure 14:
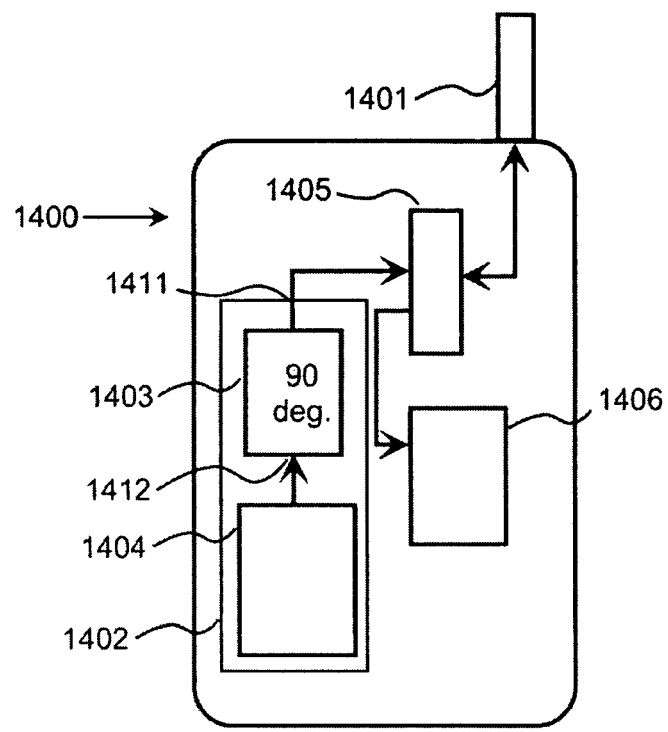
FIG. 14 shows a mobile communication device according to an embodiment of the invention.

FIG. 14 shows a mobile communication device 1400 according to an embodiment of the invention. The mobile communication device 1400 comprises an antenna 1401 and a transmitting element 1402. The transmitting element 1402 has a 90 degrees phase shifter 1403 and a signal source 1404. A signal output terminal 1411 of the transmitting element 1402 is coupled to the antenna 1401 via a duplexer and antenna front-end element 1405. In this case the antenna 1401 and the duplexer and antenna front-end element 1405 constitute a channel front-end circuit from the viewpoint of the transmitting element 1402. The signal source 1404 represents all the parts of the mobile communication device that provides an RF-input signal to a signal input 1412 of the 90 degrees phase shifter 1403, e.g. a microphone, an analog-to-digital converter, a codec, an up-modulator, a power amplifier, etc. A block 1406 represents all the parts of the mobile communication device that process a signal received from the antenna 1401 via the duplexer and antenna front-end element 1405, e.g. a demodulator, equalizers, filtering systems, controllers, a speaker, etc. The 90 degrees phase shifter 1403 is a part of a sensor element disposed to perform at least one of the following: a measurement of a level of a transmission signal delivered from the transmitting element 1402 to the antenna 1401 and an indication of an impedance mismatch on a signal path from the signal source 1404 to the antenna 1401. The sensor element is based on the principles described in earlier parts of this document and e.g. in FIG. 8a or 8b. The 90 degrees phase shifter 1403 is also at least one of the following: an impedance transformer disposed to perform impedance matching on the signal path from the signal source 1404 to the antenna 1401, a band-limiting filter disposed to attenuate frequency components of the transmission signal that are outside a predetermined frequency band on the signal path from the signal source to the antenna, and a part of an antenna switch disposed to increase an impedance of the signal output terminal 1411 of the transmitting element 1402 when the transmitting element 1402 is disabled from transmitting. The mobile communication device 1400 can be e.g. a mobile phone.

Figure 15:
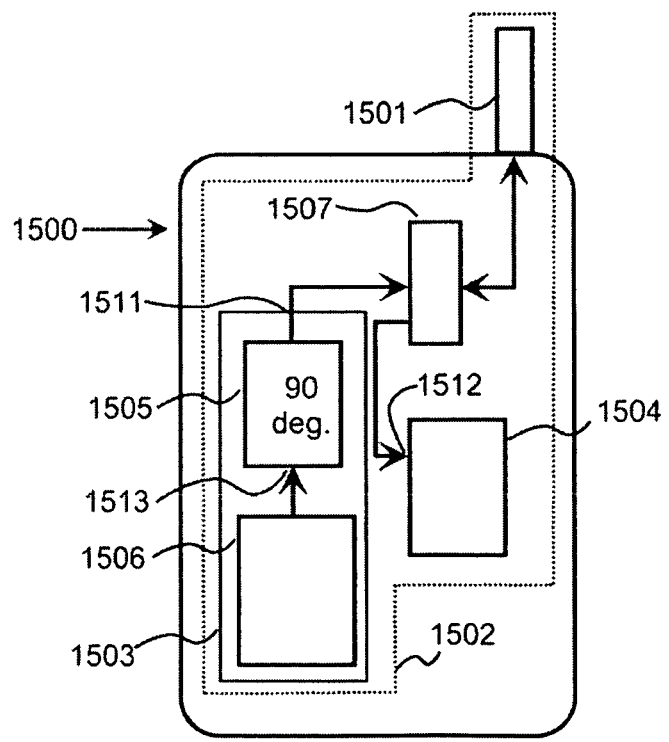
FIG. 15 shows a mobile communication device according to an embodiment of the invention.

FIG. 15 shows a mobile communication device 1500 according to an embodiment of the invention. The mobile communication device 1500 comprises a receiver-transmitter 1502. The receiver-transmitter comprises an antenna 1501 a transmitting element 1503 and a receiving element 1504. The transmitting element 1503 has a 90 degrees phase shifter 1505 and a signal source 1506. The transmitting element 1503 comprises also a transmitter part of a duplexer filter. A signal output terminal 1511 of the transmitting element 1503 and a signal input terminal 1512 of the receiving element 1504 are coupled to the antenna 1501 via an antenna front-end element 1507. In this case the antenna 1501 and the antenna front-end element 1507 constitute a channel front-end circuit from the viewpoint of the receiver-transmitter 1502. The signal source 1506 represents all the parts of the mobile communication device that provides an RF-input signal to a signal input 1513 of the 90 degrees phase shifter 1505, e.g. a microphone, an analog-to-digital converter, a codec, an up-modulator, a power amplifier, etc. The receiving element 1504 comprises all the parts of the mobile communication device that process a signal received from the antenna 1501 via the antenna front-end element 1507, e.g. a receiver part of the duplexer filter, a demodulator, equalizers, filtering systems, controllers, a speaker, etc. The 90 degrees phase shifter 1505 is a part of an antenna switch disposed to increase an impedance of the signal output terminal 1511 of the transmitting element 1503 when the transmitting element 1503 is disabled from transmitting. The 90 degrees phase shifter 1505 is also a part of the duplexer filter disposed to prevent a received signal received at the antenna 1501 from flowing to the transmitting element 1503.

The 90 degrees phase shifter 1505 can also be a part of a sensor element disposed to perform at least one of the following: a measurement of a level of a transmission signal delivered from the transmitting element 1503 to the antenna 1501 and an indication of an impedance mismatch on a signal path from the signal source 1506 to the antenna 1501. The sensor element is based on the principles described in earlier parts of this document and e.g. in FIG. 8a or 8b. Furthermore, the 90 degrees phase shifter 1505 can be an impedance transformer disposed to perform impedance matching on the signal path from the signal source 1506 to the antenna 1501 and/or a band-limiting filter disposed to attenuate frequency components of the transmission signal that are outside a predetermined frequency band. The mobile communication device 1500 can be e.g. a mobile phone.

Figure 16:
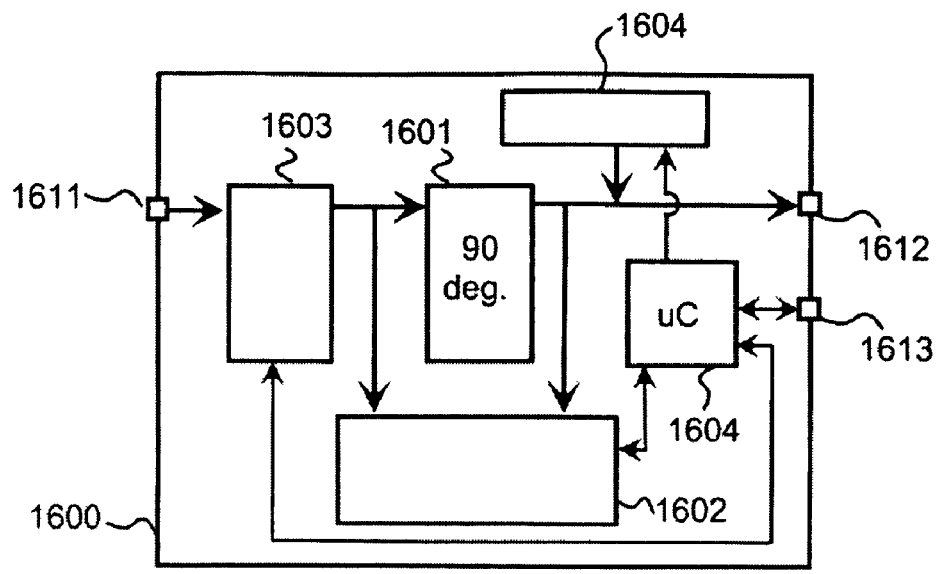
FIG. 16 shows a transmitter module according to an embodiment of the invention.

FIG. 16 shows a transmitter module 1600 according to an embodiment of the invention. The transmitter module 1600 comprises a signal input terminal 1611, a 90 degrees phase shifter 1601, and a signal output terminal 1612. The 90 degrees phase shifter 1601 is a part of a sensor element disposed to perform at least one of the following: a measurement of a level of a transmission signal delivered to the signal output terminal 1612 and an indication of an impedance mismatch on a signal path from the signal input terminal 1611 to the signal output terminal 1612. The 90 degrees phase shifter 1601 is also at least one of the following: an impedance transformer disposed to perform impedance matching on the signal path from the signal input terminal 1611 to the signal output terminal 1612, a band-limiting filter disposed to attenuate frequency components of the transmission signal that are outside a predetermined frequency band, and a part of a throw-over switch disposed to increase an impedance of the signal output terminal 1612. The sensor element is based on the principles described in earlier parts of this document and e.g. in FIG. 8a or 8b. A block 1602 represents remaining parts of the sensor element like two or four 45 degrees phase shifters, one or two adders, and one or two detectors. A block 1603 represents parts of a transmitter that are between the 90 degrees phase shifter 1601 and the signal input terminal 1611 like a bits-to-symbol encoder, an up-modulator, a power amplifier, etc. A block 1604 represents a control element of the throw-over switch. The transmitter module 1600 can comprise an internal microcontroller 1604 for controlling e.g. a gain of a power amplifier and/or a modulation frequency. The transmitter module 1600 has also a control input/output terminal 1613 for enabling an external microcontroller to control the signal processing elements of the transmitter module 1600 and/or to communicate with the internal microcontroller 1604.

Figure 17:
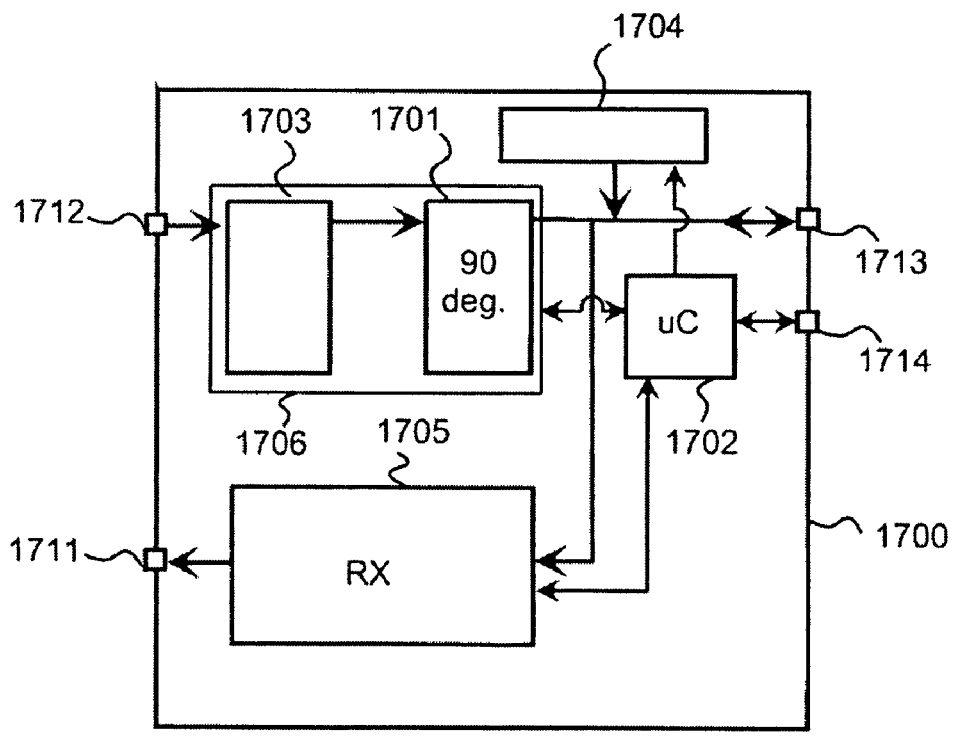
FIG. 17 shows a receiver-transmitter module according to an embodiment of the invention.

FIG. 17 shows a receiver-transmitter module 1700 according to an embodiment of the invention. The receiver-transmitter module comprises a 90 degrees phase shifter 1701, a reception terminal 1711, a transmission terminal 1712, and a channel terminal 1713. The 90 degrees phase shifter 1701 is a part of a throw-over switch disposed increase an impedance of the channel terminal 1713. The 90 degrees phase shifter 1701 is also a part of a duplexer filter disposed to prevent a received signal received at the channel terminal from flowing along a signal path from the channel terminal to the transmission terminal 1712. The 90 degrees phase shifter 1701 can also be a part of a sensor element disposed to perform at least one of the following: a measurement of a level of a transmission signal delivered to the channel terminal 1713 and an indication of an impedance mismatch on a signal path from the transmission terminal 1712 to the channel terminal 1713. The sensor element is based on the principles described in earlier parts of this document and e.g. in FIG. 8*a* or 8*b*. Furthermore, the 90 degrees phase shifter 1701 can also be an impedance transformer disposed to perform impedance matching on the signal path from the transmission terminal 1712 to the channel terminal 1713 and/or a band-limiting filter disposed to attenuate frequency components of the transmission signal that are outside a predetermined frequency band. A block 1703 represents parts of a transmitting element 1706 that are between the 90 degrees phase shifter 1701 and the transmission terminal 1712 like a bits-to-symbol encoder, an up-modulator, a power amplifier, etc. A block 1704 represents a control element of the throw-over switch. A block 1705 represents a receiving element of the receiver-transmitter module. The transmitting element 1706 comprises a transmitter part of the duplexer filter and the receiving element 1705 comprises a receiver part of the duplexer filter. The receiving element 1705 may also comprise e.g. a demodulator, a filtering system, equalizers, a symbol-to-bits decoder, etc. The receiver-transmitter module 1700 can comprise an internal microcontroller 1702 for controlling the signal processing elements of the transmitting element and the signal processing elements of receiving element. The receiver-transmitter module 1700 has a control input/output terminal 1714 for enabling an external microcontroller to control the signal processing elements of the receiver-transmitter module and/or to communicate with the internal microcontroller 1702.

Figure 18:
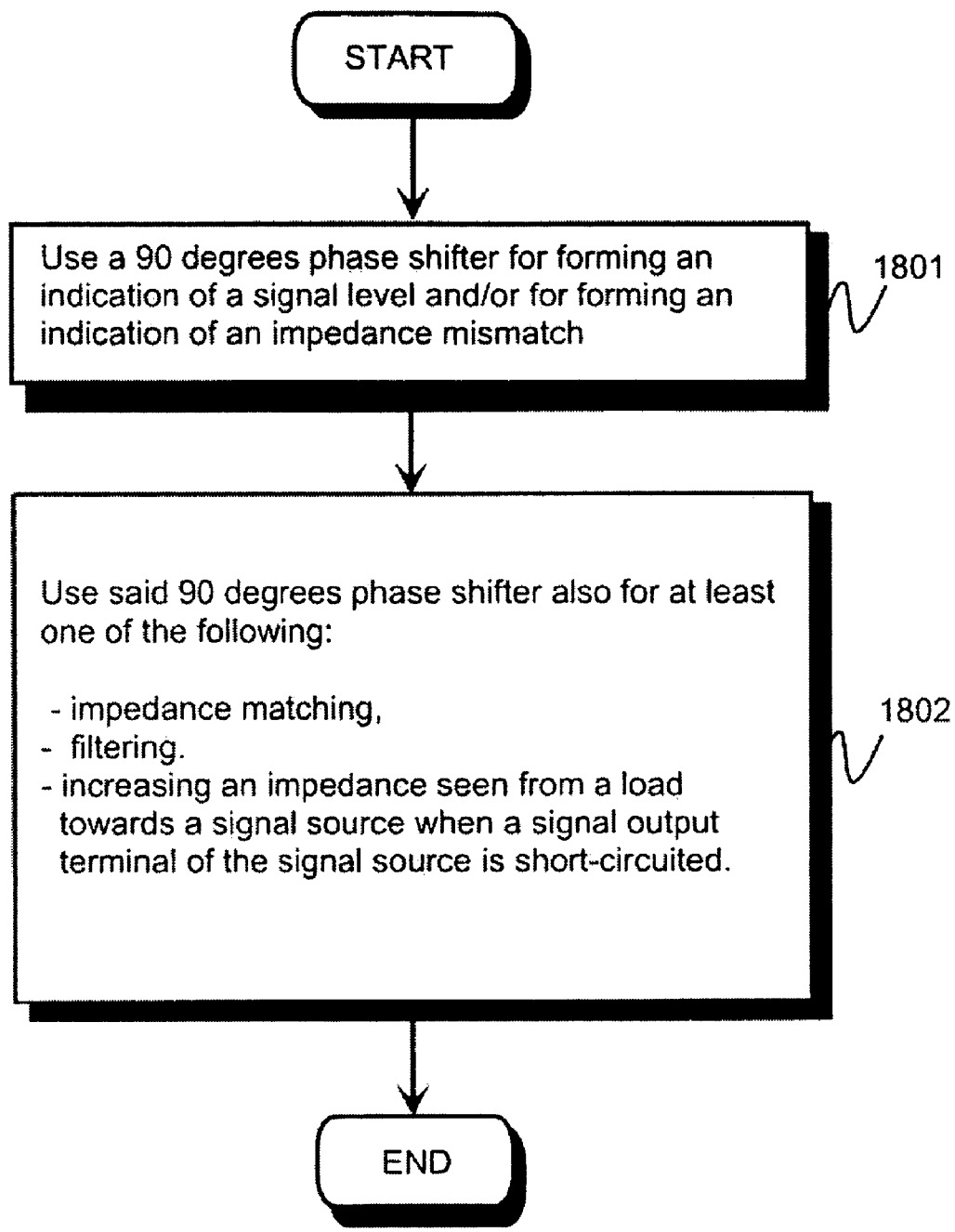
FIG. 18 shows a flow chart for a method according to an embodiment of the invention for performing analog signal processing between a signal source and a load.

FIG. 18 shows a flow chart for a method according to an embodiment of the invention for performing analog signal processing between a signal source and a load. In phase 1801 a 90 degrees phase shifter coupled between the signal source and the load is used for obtaining two signal versions of an output signal of the signal source, the two signal versions having a mutual phase shift and being used for at least one of the following: forming an indication of a level of the signal delivered to the load and forming an indication of an impedance mismatch on a signal path from the signal source to the load. In phase 1802 said 90 degrees phase shifter is used also for at least one of the following: performing impedance matching on the signal path from the signal source to the load, attenuating frequency components of the output signal of the signal source that are outside a predetermined frequency band, and increasing impedance seen from the load towards the signal source when a signal output terminal of the signal source is short-circuited.

Figure 19:
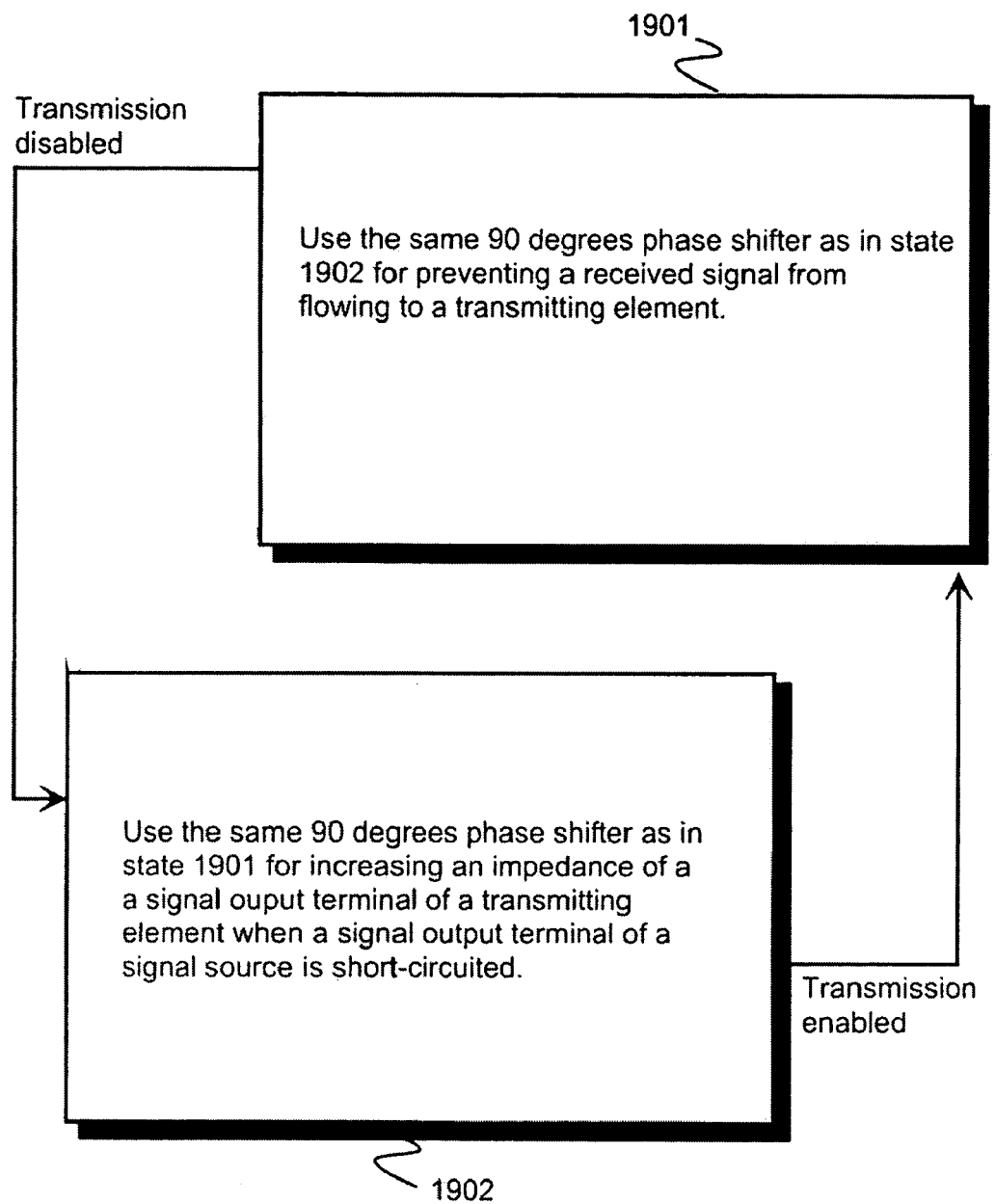
FIG. 19 shows a state diagram for a method according to an embodiment of the invention for performing analog signal processing in a receiver-transmitter.

FIG. 19 shows a state diagram for a method according to an embodiment of the invention for performing analog signal processing in a receiver-transmitter. The receiver-transmitter comprises a transmitting element, a receiving element, and a channel front-end circuit. The transmitting element comprises a signal output terminal coupled to the channel front-end circuit, a signal source, and a 90 degrees phase shifter coupled between the signal source and the signal output terminal. In a state 1901 the transmitting element has been enabled to perform transmission. In a state 1902 the transmitting element has been disabled from performing the transmission. The receiver-transmitter gets to state 1901 when the transmission is enabled and the receiver-transmitter gets to state 1902 when the transmission is disabled. In the state 1901 the method comprises using the 90 degrees phase shifter for preventing a received signal received at the channel front-end circuit from flowing to the transmitting element. In the state 1902 the method comprises using said 90 degrees phase shifter for increasing an impedance of the signal output terminal of the transmitting element when a signal output terminal of the signal source is short-circuited.

The method can further comprise using the 90 degrees phase shifter for at least one of the following: performing impedance matching on a signal path from the signal source to the channel front-end circuit, attenuating frequency components of an output signal of the signal source that are outside a predetermined frequency band, and obtaining two versions of the output signal of the signal source, the two versions having a mutual phase shift and being used for at least one of the following: forming an indication of a level of a signal delivered from the transmitting element to the channel front-end circuit and forming an indication of an impedance mismatch on the signal path from the signal source to the channel front-end circuit.

It will be evident to any person skilled in the art that the invention and its embodiments are thus not limited to the above-described examples, but may vary within the scope of the independent claims.

What is claimed is:

1. A transmitter comprising a channel front-end circuit and a transmitting element, the transmitting element having a signal source, a signal output terminal coupled to the channel front-end circuit, and a ninety degree phase shifter coupled between the signal source and the signal output terminal, wherein the ninety degree phase shifter is a part of a sensor element, the sensor element being disposed to form at least one of the following: an indication of a level of a signal delivered from the transmitting element to the channel front-end circuit and an indication of an impedance mismatch on a signal path from the signal source to the channel front-end circuit, and the ninety degree phase shifter is also at least one of the following: an impedance transformer disposed to perform impedance matching on the signal path from the signal source to the channel front-end circuit, a band-limiting filter disposed to attenuate frequency components of the an output signal of the signal source that are outside a predetermined frequency band, and a part of a throw-over switch disposed to increase an impedance of the signal output terminal of the transmitting element.

2. A transmitter according to claim 1, wherein the ninety degree phase shifter comprises a transmission line.

3. A transmitter according to claim 1, wherein the ninety degree phase shifter is composed of inductors and capacitors.

4. A transmitter according to claim 1, wherein the ninety degree phase shifter is a Π-type circuit composed of inductors and capacitors.

5. A transmitter according to claim 4, wherein the ninety degree phase shifter is a T-type circuit composed of inductors and capacitors.

6. A transmitter according to claim 1, wherein the ninety degree phase shifter is also a part of a duplexer filter disposed to prevent a received signal received at the channel front-end circuit from flowing to the transmitting element.

7. A receiver-transmitter comprising a channel front-end circuit, a receiving element, and a transmitting element, the transmitting element having a signal source, a signal output terminal coupled to the channel front-end circuit, and a ninety degree phase shifter coupled between the signal source and the signal output terminal, wherein
   the ninety degree phase shifter is a part of a throw-over switch disposed to increase an impedance of the signal output terminal of the transmitting element, and
   the ninety degree phase shifter is also a part of a duplexer filter disposed to prevent a received signal received at the channel front-end circuit from flowing to the transmitting element.

8. A receiver-transmitter according to claim 7, wherein the ninety degree phase shifter is also at least one of the following: an impedance transformer disposed to perform impedance matching on a signal path from the signal source to the channel front-end circuit, a band-limiting filter disposed to attenuate frequency components of an output signal of the signal source that are outside a predetermined frequency band, and a part of a sensor element; the sensor element being disposed to form at least one of the following: an indication of a level of a signal delivered from the transmission element to the channel front-end circuit and an indication of an impedance mismatch on the signal path from the signal source to the channel front-end circuit.

9. A receiver-transmitter according to claim 7, wherein the ninety degree phase shifter comprises a transmission line.

10. A receiver-transmitter according to claim 7, wherein the ninety degree phase shifter is composed of inductors and capacitors.

11. A receiver-transmitter according to claim 7, wherein the ninety degree phase shifter is a Π-type circuit composed of inductors and capacitors.

12. A receiver-transmitter according to claim 7, wherein the ninety degree phase shifter is a T-type circuit composed of inductors and capacitors.

13. A mobile communication device comprising an antenna and a transmitting element, the transmitting element having a signal source, a signal output terminal coupled to the antenna, and a ninety degree phase shifter coupled between the signal source and the signal output terminal, wherein
   the ninety degree phase shifter is a part of a sensor element, the sensor element being disposed to form at least one of the following: an indication of a level of a signal delivered from the transmitting element to the antenna and an indication of an impedance mismatch on a signal path from the signal source to the antenna, and
   the ninety degree phase shifter is also at least one of the following: an impedance transformer disposed to perform impedance matching on the signal path from the signal source to the antenna, a band-limiting filter disposed to attenuate frequency components of an output signal of the signal source that are outside a predetermined frequency band, and a part of an antenna switch disposed to increase an impedance of the signal output terminal of the transmitting element.

14. A mobile communication device according to claim 13, wherein the ninety degree phase shifter is also a part of a duplexer filter disposed to prevent a received signal received at the antenna from flowing to the transmitting element.

15. A mobile communication device according to claim 13, wherein the mobile communication device is a mobile phone.

16. A mobile communication device comprising a receiver-transmitter having an antenna, a receiving element, and a transmitting element, the transmitting element having a signal source, a signal output terminal coupled to the antenna, and a ninety degree phase shifter coupled between the signal source and the signal output terminal, wherein
   the ninety degree phase shifter is a part of an antenna switch disposed to increase an impedance of the signal output terminal of the transmitting element, and
   the ninety degree phase shifter is also a part of a duplexer filter disposed to prevent a received signal received at the antenna from flowing to the transmitting element.

17. A mobile communication device according to claim 16, wherein the ninety degree phase shifter is also at least one of the following: an impedance transformer disposed to perform impedance matching on a signal path from the signal source to the antenna, a band-limiting filter disposed to attenuate frequency components of an output signal of the signal source that are outside a predetermined frequency band, and a part of a sensor element; the sensor element being disposed to form at least one of the following: an indication of a level of the a signal delivered from the transmitting element to the antenna and an indication of an impedance mismatch on the signal path from the signal source to the antenna.

18. A mobile communication device according to claim 16, wherein the mobile communication device is a mobile phone.

19. A transmitter module comprising a signal input terminal, a signal output terminal, and a ninety degree phase shifter coupled between the signal input terminal and the signal output terminal, wherein
   the ninety degree phase shifter is a part of a sensor element, the sensor element being disposed to form at least one of the following: an indication of a level of a signal delivered to the signal output terminal and an indication of an impedance mismatch on a signal path from the signal input terminal to the signal output terminal, and
   the ninety degree phase shifter is also at least one of the following: an impedance transformer disposed to perform impedance matching on the signal path from the signal input terminal to the signal output terminal, a band-limiting filter disposed to attenuate frequency components of a signal received at the signal input terminal that are outside a predetermined frequency band, and a part of a throw-over switch disposed to increase an impedance of the signal output terminal.

20. A receiver-transmitter module comprising a reception terminal, a transmission terminal, a channel terminal, and a ninety degree phase shifter coupled between the transmission terminal and the channel terminal, wherein
   the ninety degree phase shifter is a part of a throw-over switch disposed increase an impedance of the channel terminal, and
   the ninety degree phase shifter is also a part of a duplexer filter disposed to prevent a received signal received at the channel terminal from flowing along a signal path from the channel terminal to the transmission terminal.

21. A receiver-transmitter module according to claim 20, wherein the ninety degree phase shifter is also at least one of the following: an impedance transformer disposed to perform impedance matching on a signal path from the transmission terminal to the channel terminal, a band-limiting filter disposed to attenuate frequency components of a signal received at the transmission terminal that are outside a predetermined frequency band, and a part of a sensor element; the sensor element being disposed to form at least one of the following: an indication of a level of a signal delivered to the channel terminal and an indication of an impedance mismatch on the signal path from the transmission terminal to the channel terminal.

* * * * *

UNITED STATES PATENT AND TRADEMARK OFFICE
CERTIFICATE OF CORRECTION

PATENT NO.       : 7,620,376 B2                                    Page 1 of 1
APPLICATION NO.  : 11/267025
DATED            : November 17, 2009
INVENTOR(S)      : Risto Väisänen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-sixth Day of October, 2010

David J. Kappos
*Director of the United States Patent and Trademark Office*